United States Patent
Mordani et al.

(10) Patent No.: US 12,009,999 B2
(45) Date of Patent: *Jun. 11, 2024

(54) SYSTEM AND METHOD FOR PROVIDING A SERVICE MANAGEMENT ENGINE FOR USE WITH A CLOUD COMPUTING ENVIRONMENT

(71) Applicant: ORACLE INTERNATIONAL CORPORATION, Redwood Shores, CA (US)

(72) Inventors: Rajiv Mordani, Sunnyvale, CA (US); Abhijit Kumar, Cupertino, CA (US); Bhavanishankara Sapaliga, Bangalore (IN); Sivakumar Thyagarajan, Bangalore (IN); Nazrul Islam, Santa Clara, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/849,497

(22) Filed: Jun. 24, 2022

(65) Prior Publication Data

US 2022/0321430 A1 Oct. 6, 2022

Related U.S. Application Data

(63) Continuation of application No. 16/162,689, filed on Oct. 17, 2018, now Pat. No. 11,374,833, which is a
(Continued)

(51) Int. Cl.
*H04L 41/50* (2022.01)
*G06F 9/50* (2006.01)

(52) U.S. Cl.
CPC ........ *H04L 41/5058* (2013.01); *G06F 9/5072* (2013.01)

(58) Field of Classification Search
CPC .................... H04L 41/5058; G06F 9/5072
See application file for complete search history.

(56) References Cited

U.S. PATENT DOCUMENTS 6,243,451 B1 6/2001 Shah
8,271,974 B2 * 9/2012 Mazhar ............... H04L 41/5054
717/177

(Continued)

FOREIGN PATENT DOCUMENTS

JP 2012068826 4/2012
JP 2012137992 7/2012
(Continued)

OTHER PUBLICATIONS

Martin, Patrick et al., "Automatic Management of Elastic Services in the Cloud", Jun. 28, 2011, pp. 135-140, Computers and Communications (ISCC), IEEE Symposium on IEEE.
(Continued)

*Primary Examiner* — Nazia Naoreen
(74) *Attorney, Agent, or Firm* — TUCKER ELLIS LLP

(57) ABSTRACT

A system and method for providing a service management engine for use with a cloud computing environment. In accordance with an embodiment, enterprise software applications (e.g., Fusion Middleware applications) can be instantiated as services within a cloud platform, where they are then made accessible by other (e.g., customer) applications. In an embodiment, a service management engine (SME), in communication with an orchestration engine, can be used to provision services as one or more different service types, according to a service definition package (SDP). Service types can be instantiated according to the configuration of the cloud platform itself, and the contents of the
(Continued)

SDP, including discovering, provisioning, and associating service types with system resources, to address different customer requirements.

17 Claims, 18 Drawing Sheets

Related U.S. Application Data continuation of application No. 13/970,403, filed on Aug. 19, 2013, now Pat. No. 10,122,596.

(60) Provisional application No. 61/799,126, filed on Mar. 15, 2013, provisional application No. 61/766,819, filed on Feb. 20, 2013, provisional application No. 61/748,658, filed on Jan. 3, 2013, provisional application No. 61/698,467, filed on Sep. 7, 2012.

(56) References Cited

U.S. PATENT DOCUMENTS

| | | |
|---|---|---|
| 8,392,566 B1 | 3/2013 | Salle |
| 8,910,278 B2 | 12/2014 | Davne |
| 9,047,132 B2* | 6/2015 | Breh ............... G06F 9/5061 |
| 9,052,961 B2* | 6/2015 | Mangtani ......... G06F 9/5072 |
| 9,083,599 B2 | 7/2015 | Huuhtanen |
| 9,177,271 B2 | 11/2015 | Thomas |
| 9,201,639 B2 | 12/2015 | Kumar |
| 9,203,774 B2 | 12/2015 | Arwe |
| 9,323,517 B2 | 4/2016 | West |
| 9,329,951 B2* | 5/2016 | Jaisinghani ........ G06F 3/048 |
| 9,336,060 B2 | 5/2016 | Nori |
| 9,342,536 B2 | 5/2016 | Kache |
| 9,357,034 B2 | 5/2016 | Kumar |
| 9,424,024 B2 | 8/2016 | Kannan |
| 9,818,127 B2 | 11/2017 | Iyoob |
| 9,882,829 B2* | 1/2018 | Maes .................. H04L 67/51 |
| 10,122,596 B2 | 11/2018 | Mordani |
| 10,230,580 B2* | 3/2019 | Maes ............... G06F 9/5072 |
| 10,404,551 B2 | 9/2019 | Thomas |
| 11,374,833 B2 | 6/2022 | Mordani |
| 2008/0189679 A1 | 8/2008 | Rodriguez |
| 2008/0216157 A1 | 9/2008 | Huuhtanen |
| 2010/0042449 A1 | 2/2010 | Thomas |
| 2011/0265164 A1 | 10/2011 | Lucovsky |
| 2012/0016681 A1 | 1/2012 | Joergensen |
| 2012/0030672 A1 | 2/2012 | Zygmuntowicz |
| 2012/0072985 A1 | 3/2012 | Davne |
| 2012/0203908 A1 | 8/2012 | Beaty |
| 2012/0266168 A1 | 10/2012 | Spivak |
| 2012/0324069 A1 | 12/2012 | Nori |
| 2013/0227143 A1 | 8/2013 | Stevens |
| 2013/0297668 A1 | 11/2013 | McGrath |
| 2013/0297795 A1 | 11/2013 | McGrath |
| 2013/0345945 A1 | 12/2013 | Fischer |
| 2013/0346945 A1 | 12/2013 | Yousouf |
| 2014/0006627 A1 | 1/2014 | Arwe |
| 2014/0074973 A1 | 3/2014 | Kumar |
| 2014/0075019 A1 | 3/2014 | Mordani |
| 2014/0075412 A1 | 3/2014 | Kannan |
| 2014/0075426 A1 | 3/2014 | West |
| 2014/0075431 A1 | 3/2014 | Kumar |
| 2014/0278808 A1 | 9/2014 | Iyoob |
| 2015/0074279 A1 | 3/2015 | Maes |
| 2015/0089031 A1 | 3/2015 | Kalali |
| 2015/0089039 A1 | 3/2015 | Mehta |
| 2015/0089041 A1 | 3/2015 | Mehta |
| 2015/0089065 A1 | 3/2015 | Kasso |
| 2019/0052550 A1 | 2/2019 | Mordani |

FOREIGN PATENT DOCUMENTS

| | | |
|---|---|---|
| WO | 2012100092 | 7/2012 |
| WO | 20120136233 | 10/2012 |

OTHER PUBLICATIONS

Kumar, Monica et al., "The Most Complete and Integrated Virtualization: From Desktop to Datacenter, An Oracle White Paper", Oct. 2010, 13 pages.

Rodero-Merino, Luis et al., "From Infrastructure delivery to service management in clouds", Oct. 1, 2010, pp. 1226-1240, vol. 26, No. 8, Future Generations Computer Systems, Elsevier Science Publishers, Netherlands.

Thanawala, Milan et al., "Oracle SaaS Platform: Building On-Demand Applications; An Oracle White Paper", Sep. 2008, 21 pages.

Piech, Mike, "Platform-as-a-Service Private Cloud with Oracle Fusion Middleware, An Oracle White Paper", Oct. 2009, 20 pages.

ORACLE®, "Cost Effective Security and Compliance with Oracle Database 11g Release 2, An Oracle White Paper", Mar. 2011, 14 pages.

Joshi, Maneesh et al., "Bridging the Divide between SaaS and Enterprise Datacenters, An Oracle White Paper", Feb. 2010, 18 pages.

McKendrick, Joseph, "Privatizing the Cloud 2010 IOUG Survey on Cloud Computing" Unisphere Research, Oct. 2010, 33 pages.

Glas, Michael et al., "Achieving the Cloud Computing Vision, An Oracle White Paper in Enterprise Architecture", Oct. 2010, 22 pages.

Venkataraman, Girish et al., "Oracle's Cloud Solutions for Public Sector, An Oracle White Paper", Apr. 2011, 28 pages.

ORACLE®, "Creating a Self-Service Dev/Test Cloud, A Case Study from Oracle Product Development IT, An Oracle White Paper", Jul. 2011, 12 pages.

ORACLE®, "Oracle Exadata Database Machine, Security Overview", 2011, 2 pages.

Chauhan, Tony et al., "On-Demand Sourcing: Driving Costs Down and Value Up in a Period of Increased Business Volatility", The Hackett Group, Jun. 11, 2010, 5 pages.

ORACLE®, "Oracle Identity Management 11g", 2010, 4 pages.

Silverstein, Paul et al., "Architectural Strategies for IT Optimization: From Silos to Clouds, An Oracle White Paper on Enterprise Architecture", May 2010, 21 pages.

ORACLE®, "Oracle Optimized Solution for Enterprise Cloud Infrastructure, An Oracle Technical White Paper", Jun. 2011, 32 pages.

Wang, Rex, "Oracle Cloud Computing, An Oracle White Paper", Jun. 2011, 16 pages.

Gulati, Machup et al., "Cloud Management Using Oracle Enterprise Manager 11g, An Oracle White Paper", Apr. 2010, 25 pages.

ORACLE®, "Accelerating Enterprise Cloud Infrastructure Deployments", 2011, 4 pages.

Wahl, Peter et al., "Oracle Advanced Security with Oracle Database 11g Release 2, Oracle White Paper", Oct. 2010, 12 pages.

ORACLE®, "Reduce TCO and Get More Value from your X86 Infrastructure", 2011, 4 pages.

Thinkstrategies, Inc., "Oracle Offers ISVs Comprehensive Platform to Deliver SaaS Applications", 2008, 2 pages.

Kommalapati, Hanu, "Microsoft Azure for Enterprises", MSDN Magazine, Feb. 2010 Issue, 17 pages, retrieved from: <https://docs.microsoft.com/en-us/archive/msdn-magazine/2010/february/cloud-computing-microsoft-azure-for-enterprises>.

Srivastava, Alok et al., "Oracle® Dynamic Services User's and Administrator's Guide, Release 9.0.1", Jun. 2001, Part No. A88783-01, Copyright© 2000, 2001, 202 pages.

Demarest, George et al., "Oracle Cloud Computing, An Oracle White Paper", May 2020, 22 pages.

McChesney, Bobby et al., "Manage application services with virtual application patterns" © Copyright IBM Corporation 2012, Apr. 11, 2012, 15 pages.

Stern, Janet et al., Oracle@ Database, 2 Day + Real Application Clusters Guide, 11g Release 1 (11.1), B28252-01, Copyright© 2006, 2007, Jul. 2007, 198 pages.

\* cited by examiner

SYSTEM AND METHOD FOR PROVIDING A SERVICE MANAGEMENT ENGINE FOR USE WITH A CLOUD COMPUTING ENVIRONMENT

CLAIM OF PRIORITY

This application is a continuation of U.S. Patent Application titled "SYSTEM AND METHOD FOR PROVIDING A SERVICE MANAGEMENT ENGINE FOR USE WITH A CLOUD COMPUTING ENVIRONMENT", application Ser. No. 16/162,689, filed Oct. 17, 2018; which is a continuation of U.S. Patent Application titled "SYSTEM AND METHOD FOR PROVIDING A SERVICE MANAGEMENT ENGINE FOR USE WITH A CLOUD COMPUTING ENVIRONMENT", application Ser. No. 13/970,403, filed Aug. 19, 2013, now U.S. Pat. No. 10,122,596 issued Nov. 6, 2018; which claims the benefit of priority to U.S. Provisional Patent Application titled "SYSTEM AND METHOD FOR PROVIDING A CLOUD COMPUTING ENVIRONMENT", Application No. 61/698,467, filed Sep. 7, 2012; U.S. Provisional Patent Application titled "SYSTEM AND METHOD FOR PROVIDING A CLOUD COMPUTING ENVIRONMENT", Application No. 61/748,658, filed Jan. 3, 2013; U.S. Provisional Patent Application titled "SYSTEM AND METHOD FOR PROVIDING A CLOUD COMPUTING ENVIRONMENT", Application No. 61/766,819, filed Feb. 20, 2013; and U.S. Provisional Patent Application titled "SYSTEM AND METHOD FOR PROVIDING A SERVICE MANAGEMENT ENGINE FOR USE WITH A CLOUD COMPUTING ENVIRONMENT", Application No. 61/799,126, filed Mar. 15, 2013; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing, and in particular to systems and methods for providing a service management engine for use with a cloud computing environment.

BACKGROUND

The term "cloud computing" is generally used to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include:

Software as a Service (SaaS), in which consumers use software applications that are running upon a cloud infrastructure, while a SaaS provider manages or controls the underlying cloud infrastructure and applications.

Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment).

Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer).

The above examples are provided to illustrate some of the types of environment within which embodiments of the invention can generally be used. In accordance with various embodiments, the systems and methods described herein can also be used with other types of cloud or computing environments.

SUMMARY

Described herein is a system and method for providing a service management engine for use with a cloud computing environment. In accordance with an embodiment, enterprise software applications (e.g., Fusion Middleware applications) can be instantiated as services within a cloud platform, where they are then made accessible by other (e.g., customer) applications. In an embodiment, a service management engine (SME), in communication with an orchestration engine, can be used to provision services as one or more different service types, according to a service definition package (SDP). Service types can be instantiated according to the configuration of the cloud platform itself, and the contents of the SDP, including discovering, provisioning, and associating service types with system resources, to address different customer requirements.

DETAILED DESCRIPTION

As described above, a cloud computing environment (cloud environment, or cloud) can be implemented in a variety of different ways to best suit different requirements: for example, public cloud, private cloud, community cloud, or hybrid cloud. A cloud computing model enables some of those responsibilities which previously may have been provided by an organization's own information technology department, to instead be delivered as service layers within a cloud environment, for use by consumers (either within or external to the organization, according to the cloud's public/ private nature).

Described herein are a variety of hardware and/or software components and features, which can be used in delivering an infrastructure, platform, and/or applications to support cloud computing environments. In accordance with various embodiments, the system can also utilize hardware and software such as Oracle Exalogic and/or Exadata machines, WebLogic and/or Fusion Middleware, and other hardware and/or software components and features, to provide a cloud computing environment which is enterprise-grade, enables a platform for development and deploying applications, provides a set of enterprise applications built on modern architecture and use cases, and/or provides flexible consumption choices.

Figure 1:
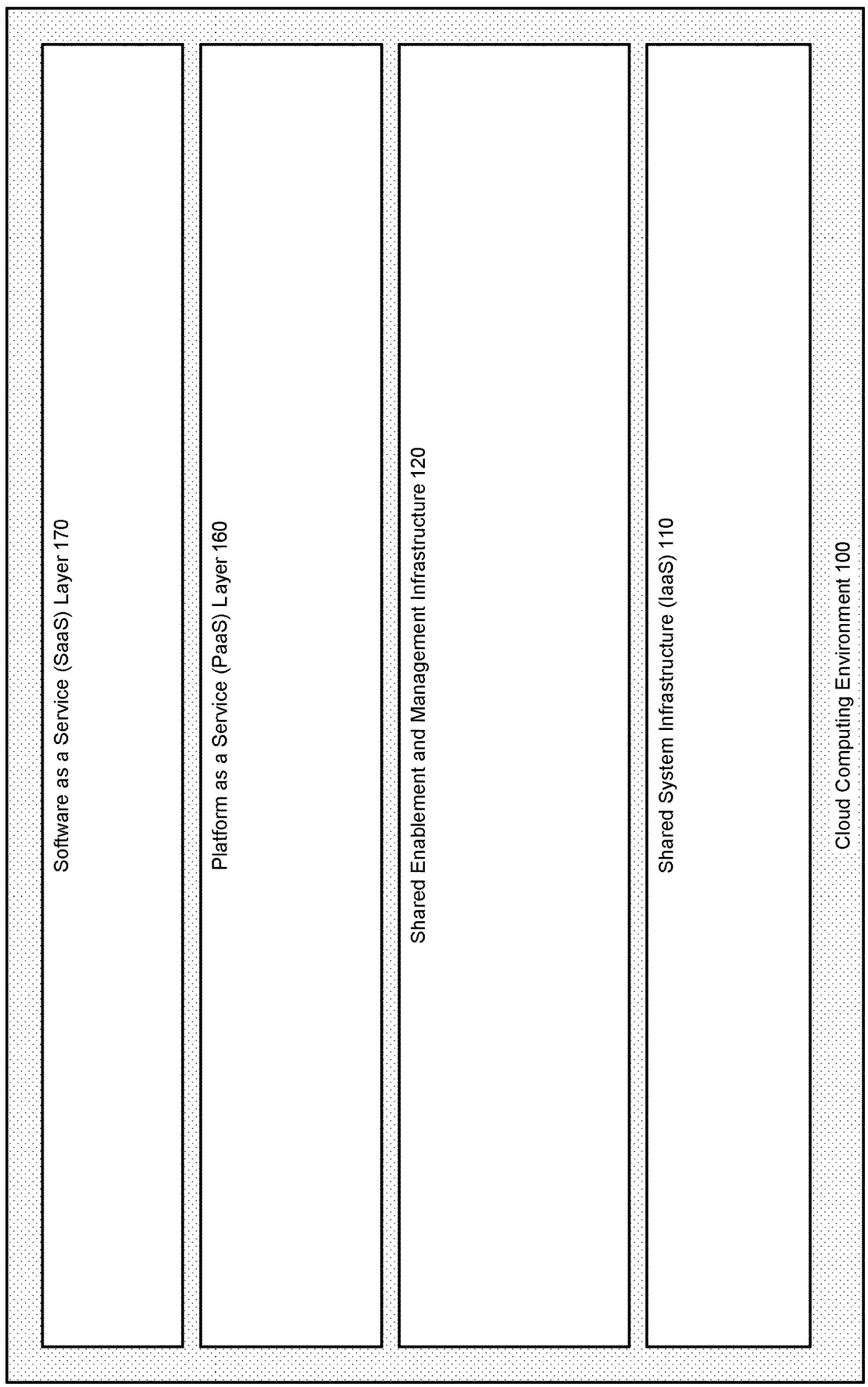
FIG. 1 illustrates a cloud computing environment including service layers, in accordance with an embodiment.

FIG. 1 illustrates a cloud computing environment including service layers, in accordance with an embodiment. As shown in FIG. 1, in accordance with an embodiment, a cloud computing environment (cloud environment, or cloud) 100 can generally include a combination of one or more Infrastructure as a Service (IaaS) layer 110, Platform as a Service (PaaS) layer 160, and/or Software as a Service (SaaS) layer 170, each of which are delivered as service layers within the cloud environment, and which can be used by consumers within or external to the organization, depending on the particular cloud computing model being used.

In accordance with an embodiment, the cloud computing environment can be implemented as a system that includes one or more conventional general purpose or specialized digital computers, computing devices, machines, microprocessors, memory and/or computer readable storage media, for example the computer hardware, software, and resources provided by Oracle Exalogic, Exadata, or similar machines.

As further shown in FIG. 1, in accordance with an embodiment, the cloud computing environment can include a shared enablement and managing infrastructure 120, which is described in further detail below, and which provides enablement and management tools that can be used to support the various service layers.

The example shown in FIG. 1 is provided as an illustration of a type of cloud computing environment in which embodiments of the invention can generally be used. In accordance with various embodiments, the systems and methods described herein can also be used with different and/or other types of cloud or computing environments.

Figure 2:
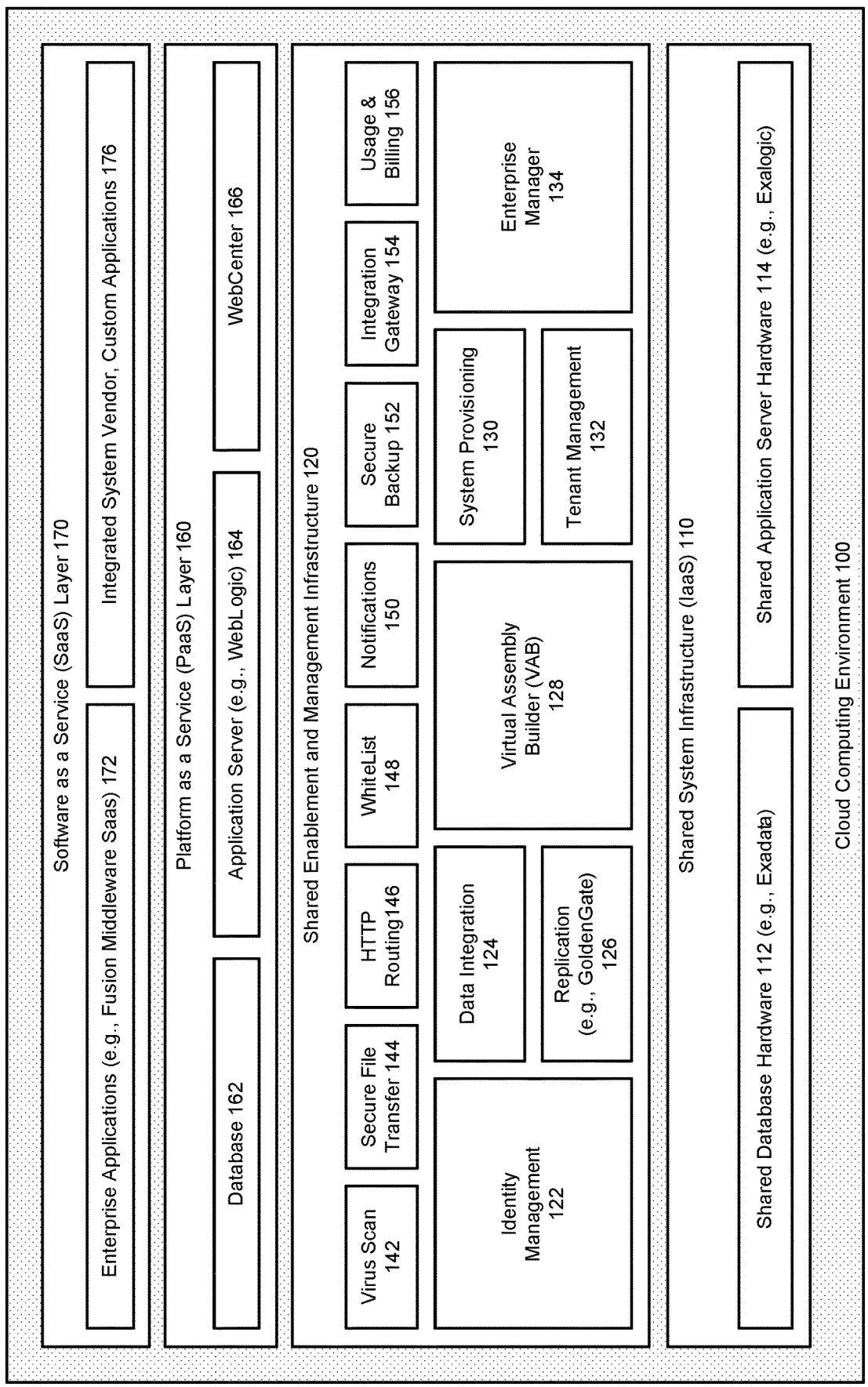
FIG. 2 further illustrates an environment, in accordance with an embodiment.

FIG. 2 further illustrates an environment, in accordance with an embodiment. As shown in FIG. 2, in accordance with an embodiment, each of the IaaS, PaaS, and/or SaaS layers can generally include a variety of components. For example, in accordance with an embodiment, the IaaS layer can include a shared database hardware (e.g., an Exadata machine) 112, and/or a shared application server hardware (e.g., an Exalogic machine). The PaaS layer can include one or more PaaS services, such as a database service 162, application server service 164, and/or WebCenter service 166. The SaaS layer can include various SaaS services, such as enterprise applications (e.g., Oracle Fusion SaaS) 172, and/or ISV or custom applications 176.

As described above, in accordance with an embodiment, the cloud computing environment can also include a shared enablement and management infrastructure. For example, as shown in FIG. 2, the shared enablement and management infrastructure can include one or more identity management 122, data integration 124, replication (e.g., Oracle Golden-Gate) 126, virtual assembly builder 128, system provisioning 130, tenant management 132, and/or enterprise manager components 134.

As further shown in FIG. 2, in accordance with an embodiment, the shared enablement and managing infrastructure can also include other components, such as virus scan 142, secure file transfer 144, HTTP routing 146, whitelist 148, notifications 150, secure backup 152, integration gateway 154, and/or usage & billing 156 components.

The example shown in FIG. 2 is provided as an illustration of some of the types of components which can be included in a cloud computing environment, or within a shared enablement and management infrastructure. In accordance with other embodiments, different and/or other types or arrangements of components can be included.

PaaS Platform Component

In accordance with an embodiment, the cloud computing environment can include a PaaS platform component (PaaS platform), which enables provisioning of enterprise software applications within a cloud environment.

Figure 3:
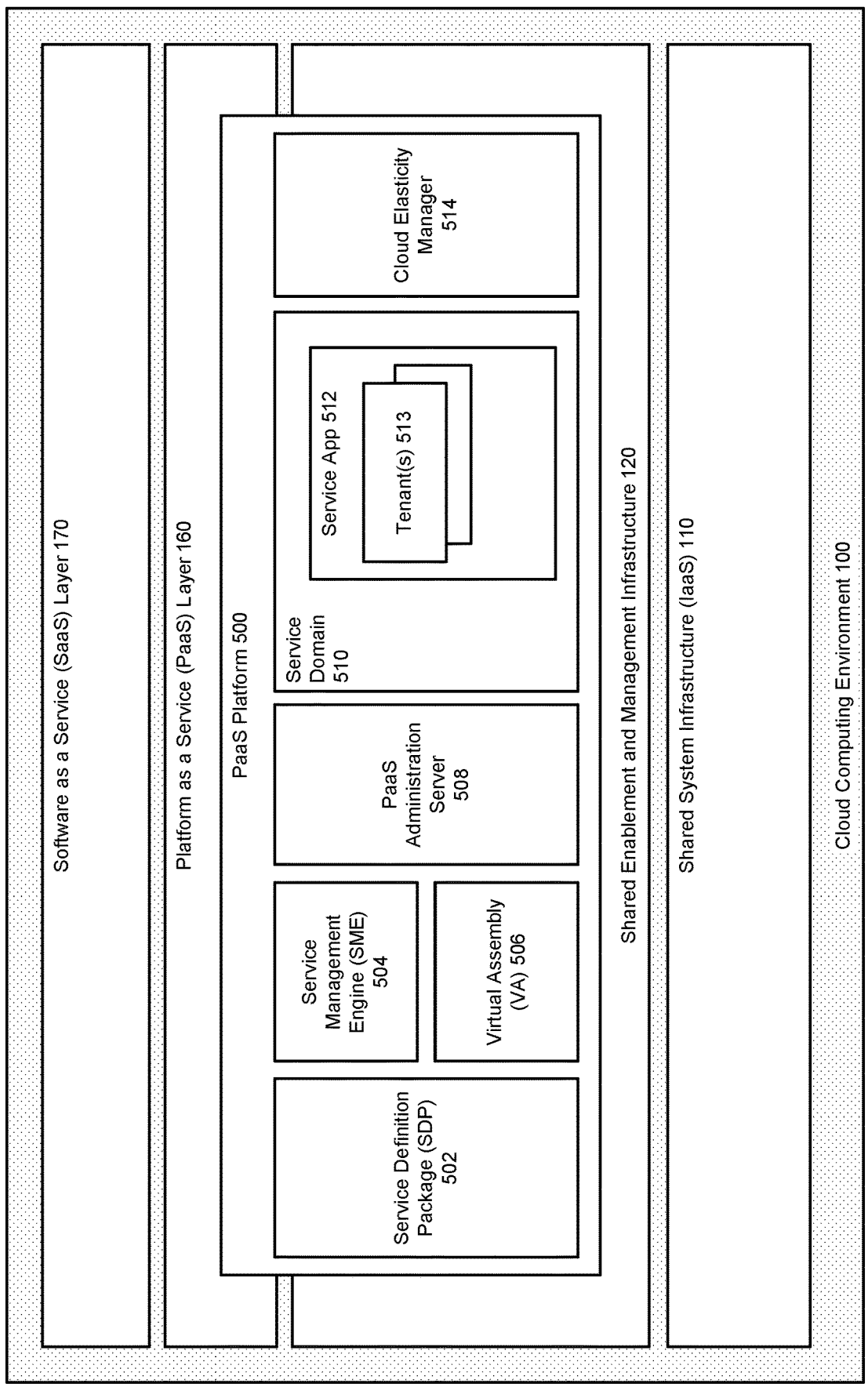
FIG. 3 illustrates a cloud computing environment that can include a PaaS platform component, in accordance with an embodiment.

FIG. 3 illustrates a cloud computing environment that can include a PaaS platform component, in accordance with an embodiment. As shown in FIG. 3, in accordance with an embodiment, the PaaS platform 500 can be provided as an installable software suite that provides a self-service provisioning experience for enterprise applications, such as Fusion Middleware or other enterprise applications.

Generally, installing and configuring enterprise applications for an organization's on-premise or private cloud environment can involve a considerable amount of administrative work, including challenges faced by an administrator when trying to scale their environment horizontally to meet increased workload demands. In accordance with an embodiment, the PaaS platform component can be easily extended to host new enterprise application suites when desired, and to thereafter scale the quantity of instantiated runtimes according to increases in load.

As shown in FIG. 3, in accordance with an embodiment, the PaaS platform can include one or more service definition package (SDP) 502, service management engine (SME) 504, virtual assembly (VA) 506, PaaS administration server 508, service domain 510 (including one or more service apps 512 for use by one or more cloud accounts or tenants 513), and/or cloud elasticity manager 514 components. Each of these components, together with other components and features, are described in further detail below.

Glossary

In accordance with an embodiment, the following terms are used herein. In accordance with other embodiments, different and/or other terms can be used.

PaaS Platform Component (PaaS Platform, platform): In accordance with an embodiment, a PaaS platform component (PaaS platform, platform) is an installable software suite that provides a self-service provisioning experience for enterprise applications, such as Fusion Middleware or other enterprise applications.

Cloud Account (Tenant): In accordance with an embodiment, a cloud account (tenant) is an entity that is associated with those users/consumers that consume the PaaS platform as a service. A cloud account establishes an administrative scope, which account administrators can then use to access PaaS services. For example, a cloud account can be created for an organization or company that is buying PaaS services from a public PaaS provider. As another example, a cloud account can be created for a department or group that is consuming PaaS services from an internal information technology department that is acting as a private PaaS provider. In accordance with an embodiment, different PaaS user roles, such as the cloud account administrator role described below, can be associated with a cloud account. In accordance with an embodiment, within the PaaS platform, consumed resources, such as services together with their virtual machines, databases, DNS entries, load-balancer, and other configurations, can be associated with a cloud account. One or more users, and zero or more services can similarly be associated with a cloud account. A PaaS platform domain can be associated with one, or a plurality of cloud accounts (tenants).

Service Definition Package: In accordance with an embodiment, a Service Definition Package (SDP) is a package that contains all of the information that is necessary for a particular type of service to be offered by the PaaS platform. For example, when used with Fusion Middleware, each type of Fusion Middleware service can provide its own SDP. In accordance with an embodiment, an SDP includes custom code that is installed into the platform, together with a virtual assembly (e.g., an OVAB assembly) that contains the topology and configuration of a set of virtual appliances that will comprise a running instance of the service once deployed onto a set of virtual machines (VM). For example, a Fusion Middleware application SDP can include custom code together with a Fusion Middleware OVAB assembly that contains the topology and configuration needed to deploy a running instance of that Fusion Middleware application as a service.

Service Type: In accordance with an embodiment, a service type is a representation of a software functionality that can be instantiated within the PaaS platform for a cloud account. In accordance with an embodiment, a service type can be created based on an SDP, with additional configuration information supplied by the system administrator. Some of this configuration information may supply values that are specific to an installation of the platform product or the enterprise in which it is running; while other configuration information may reflect a system administrator's choices of options supported by the SDP. In accordance with an embodiment, multiple (different) service types can be created from a single SDP, by making different configuration choices.

Service: In accordance with an embodiment, a service is an instantiation of a service type. A cloud account can be associated with multiple services. Within a single cloud account, there can be multiple services for a single service type. In accordance with an embodiment, a service provides both a service administration interface, and an end-user interface. A service can be associated with identity, database, or other service features that are required by the service. A service is associated with a service runtime that runs on one or more VMs.

Provider Type: In accordance with an embodiment, a provider type is a special kind of service type that supports providers instead of services. Provider types are created by the system administrator in the same way as service types. As with the service types described above, a provider type can be created based on an SDP, with additional configuration information supplied by the system administrator. Similarly, some of this configuration information may supply values that are specific to an installation of the platform product or the enterprise in which it is running; while other configuration information may reflect the system administrator's choices of options supported by the SDP. In accordance with an embodiment, multiple (different) provider types can be created from a single SDP, by making different configuration choices.

Provider: In accordance with an embodiment, a provider is a specialization of a service. Unlike services, which are generally created by the explicit action of a cloud account administrator, providers can be created on demand to satisfy the dependencies of services. In accordance with an embodiment, a provider is an instantiation of a provider type, and represents the use of a resource managed by the provider type, by a particular instance of a service type. Services can be associated with multiple providers. In accordance with an embodiment, when creating a service, an orchestration engine matches the requirements of a desired service type with the capabilities of configured provider types. The orchestration engine then requests the service type to create an instance of a service; requests the provider types to create instances of the providers for use by this instance of the service; and associates the service with the providers.

Association Resource: In accordance with an embodiment, an association resource (provider resource) enables a service to keep track of configuration information for a particular association. For example, if a Java service is associated with two different database providers, it may need to create a connection pool for each database. An association resource allows the Java service to keep track of which connection pool is associated with which database, so that, if the orchestration engine subsequently needs to change one of the associations, the Java service will know which connection pool to change.

Runtime: In accordance with an embodiment, a runtime is a representation of an installed operational software application that provides the functionality of a service or a provider. In accordance with an embodiment, runtimes are managed by the custom code included in an SDP, in some instances using the facilities provided by the PaaS platform, such as virtualization and provisioning support.

Environment: In accordance with an embodiment, an environment is a collection of services and their associated providers, which can be managed together as a group. An environment can be created for the purpose of running an application, or providing a higher level service. Environments provide the ability to operate on a collection of services as a whole, including operations such as start, stop, backup, or destroy. In accordance with an embodiment, an environment can provide the functions of an "association group" and a "management group".

System Administrator (Role): In accordance with an embodiment, a system administrator is responsible for installing, configuring, managing, and maintaining the cloud environment and/or the PaaS platform infrastructure and environment, including the resources that are made available to applications running in the environment. For example, in accordance with an embodiment, the system administrator is responsible for downloading and installing SDPs to support new/additional service types; setting up or configuring the virtualization technology for the PaaS platform to use; and installing and configuring providers.

Cloud Account Administrator (Role): In accordance with an embodiment, a cloud account administrator is responsible for the provisioning of new services, the management of generic service properties (such as their Quality of Service/QoS settings) and their associations, and the locking and termination of services. In accordance with an embodiment, the cloud account administrator can assign service administrators for each service.

Service Administrator (Role): In accordance with an embodiment, a service administrator is responsible for administering and managing a specific service after it has been provisioned. A service administrator can interact with the service's administration interface to perform administration and management operations.

Application Deployer (Role): In accordance with an embodiment, an application deployer deploys an application to the provisioned service, and is responsible for installing, configuring, and running the application. Once the application is running it can then be made available to an end user.

End User (Role): In accordance with an embodiment, an end user is a user of the application which the application deployer has deployed to the service. The end user can interact with a user interface provided by the application deployed to the service. If the service provides an interface for users to consume the functionality that it exposes, then the end user can use that interface provided by the service, without requiring the application deployer to deploy an application.

Figure 4:
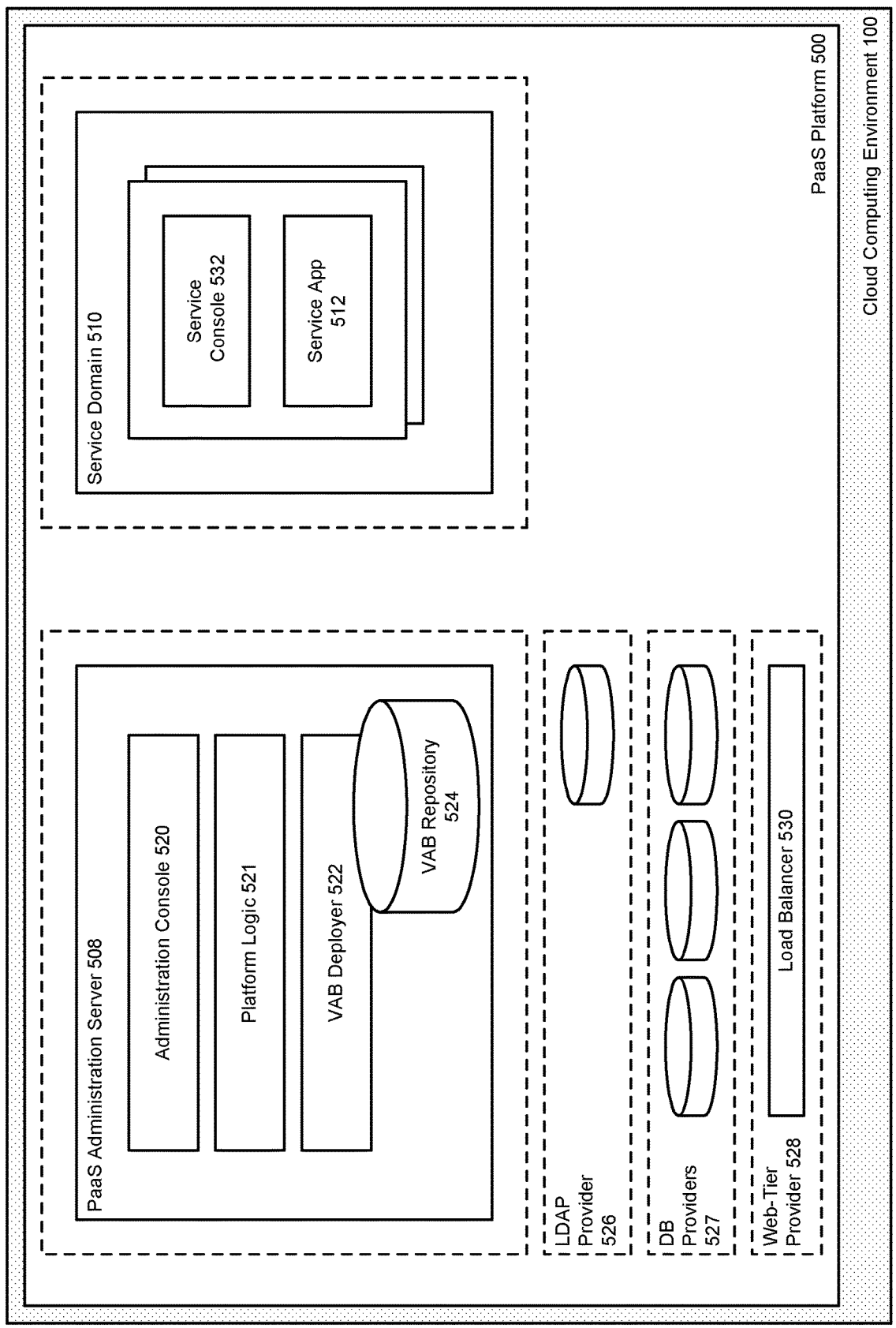
FIG. 4 further illustrates a PaaS platform component, including an administration server and a service domain, in accordance with an embodiment.

FIG. 4 further illustrates a PaaS platform component, including an administration server and a service domain, in accordance with an embodiment. As shown in FIG. 4, in accordance with an embodiment, once installed, the PaaS platform (platform) comprises a PaaS administration server 508, which supports an administration console 520, a cloud platform provisioning/management logic 521, and a virtual assembly builder (VAB) deployer 522, together with an assembly or VAB repository.

In accordance with an embodiment, the VAB deployer can be provided by functionality, components or products such as Oracle Virtual Assembly Builder (OVAB). The VAB deployer (e.g., the OVAB Deployer) can then be used by the PaaS platform to manage those VMs that will host the servicing applications. In accordance with other embodiments, other means of providing assembly builder functionality or components can be used.

In accordance with an embodiment, the PaaS administration server can be implemented as a WebLogic (WLS) server application, together with, e.g., Glassfish modules embedded therein to provide cloud platform functionality. A service domain 510, including a service app and service console 532, can be provided for housing those enterprise applications, such as the Fusion Middleware applications, that will ultimately service user requests. In accordance with an embodiment, the service domain components may be instantiated multiple times as part of provisioning requests.

In accordance with an embodiment, provider server types that will be used by the PaaS administration server and the service domain (examples of which can include LDAP 526, database 527, and load-balancer 528 providers) can be provided in pools that are not provisioned by the administration server, since these are external services that are registered with the cloud environment. In accordance with an embodiment, the PaaS platform can make use of a single load-balancer provider to forward all incoming, e.g., Web requests, that are directed to the services. For example, each service can be associated with a virtual host name that will be registered with the load-balancer provider during service provisioning, and the PaaS platform can include a pool of database providers which those services can utilize. When a service is later provisioned, all external references to a database service are then resolved to point to one or more instances in the database provider pool.

Figure 5:
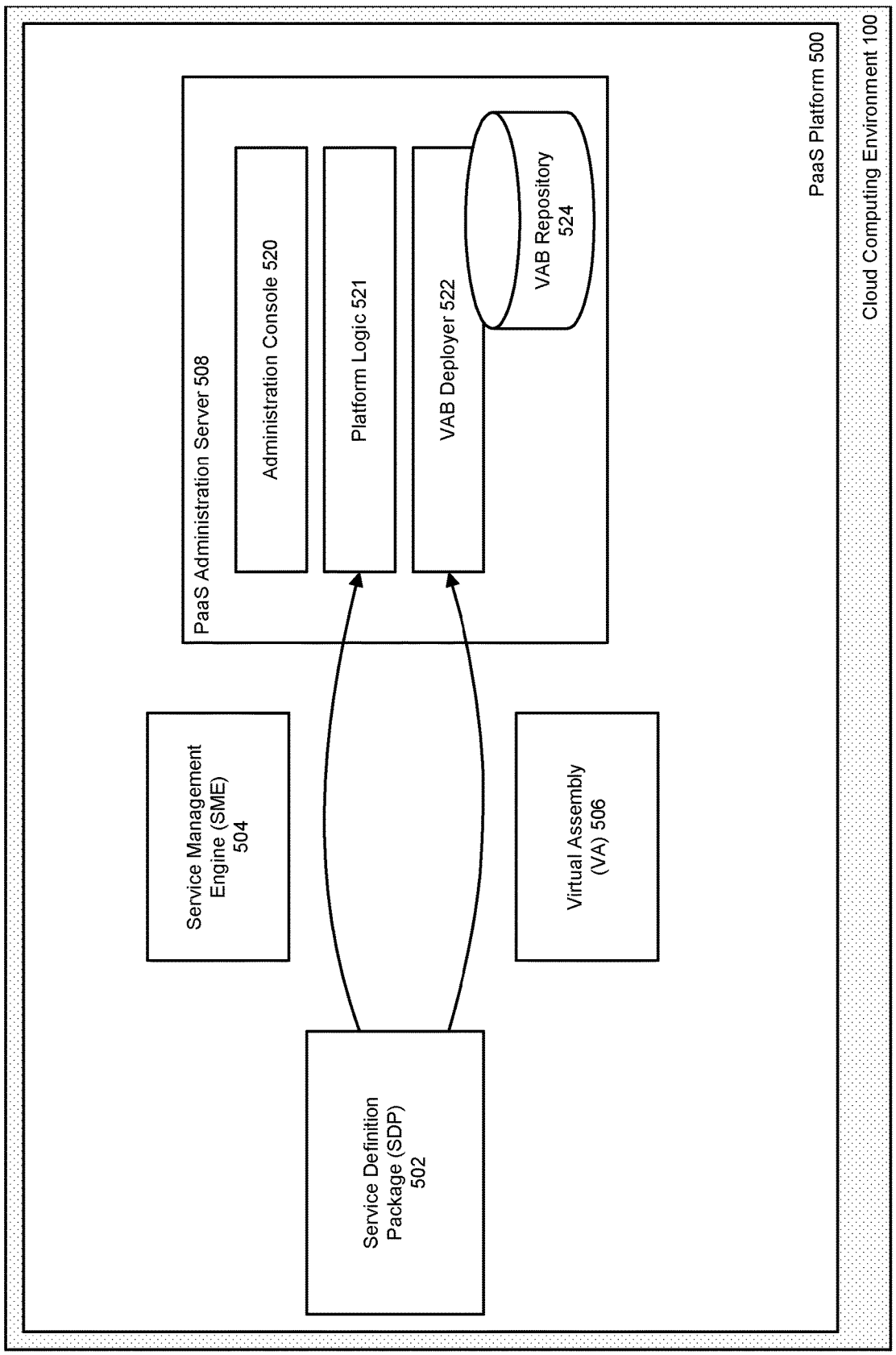
FIG. 5 further illustrates a PaaS platform component, including the use of service definition packages and service management engines with an administration server, in accordance with an embodiment FIG. 6 further illustrates a PaaS platform component, including the interaction between an administration server and a virtualization manager, in accordance with an embodiment FIG. 7 further illustrates a PaaS platform component, including a multiple tenant service domain, in accordance with an embodiment.

FIG. 5 further illustrates a PaaS platform component, including the use of service definition packages and service management engines with an administration server, in accordance with an embodiment. As shown in FIG. 5, in accordance with an embodiment, new enterprise application service types (e.g., new Fusion Middleware service types), which the administrator wishes to make available for use within the PaaS platform, can be installed from an SDP.

In accordance with an embodiment, SDPs can be downloaded over the Internet, or can be provided by other means. Each SDP contains custom code that can be injected into the PaaS platform, for use in supporting, e.g., elasticity and provisioning; together with an assembly (e.g., an OVAB assembly) that contains the topology and configuration of a set of virtual appliances that will comprise a running instance of the enterprise application service once the assembly is deployed onto a set of VMs. Each of the service types/providers that the PaaS administrator interacts with can be registered with the system in this manner. Other provider service types, such as external services, can be generally pre-installed.

Figure 6:
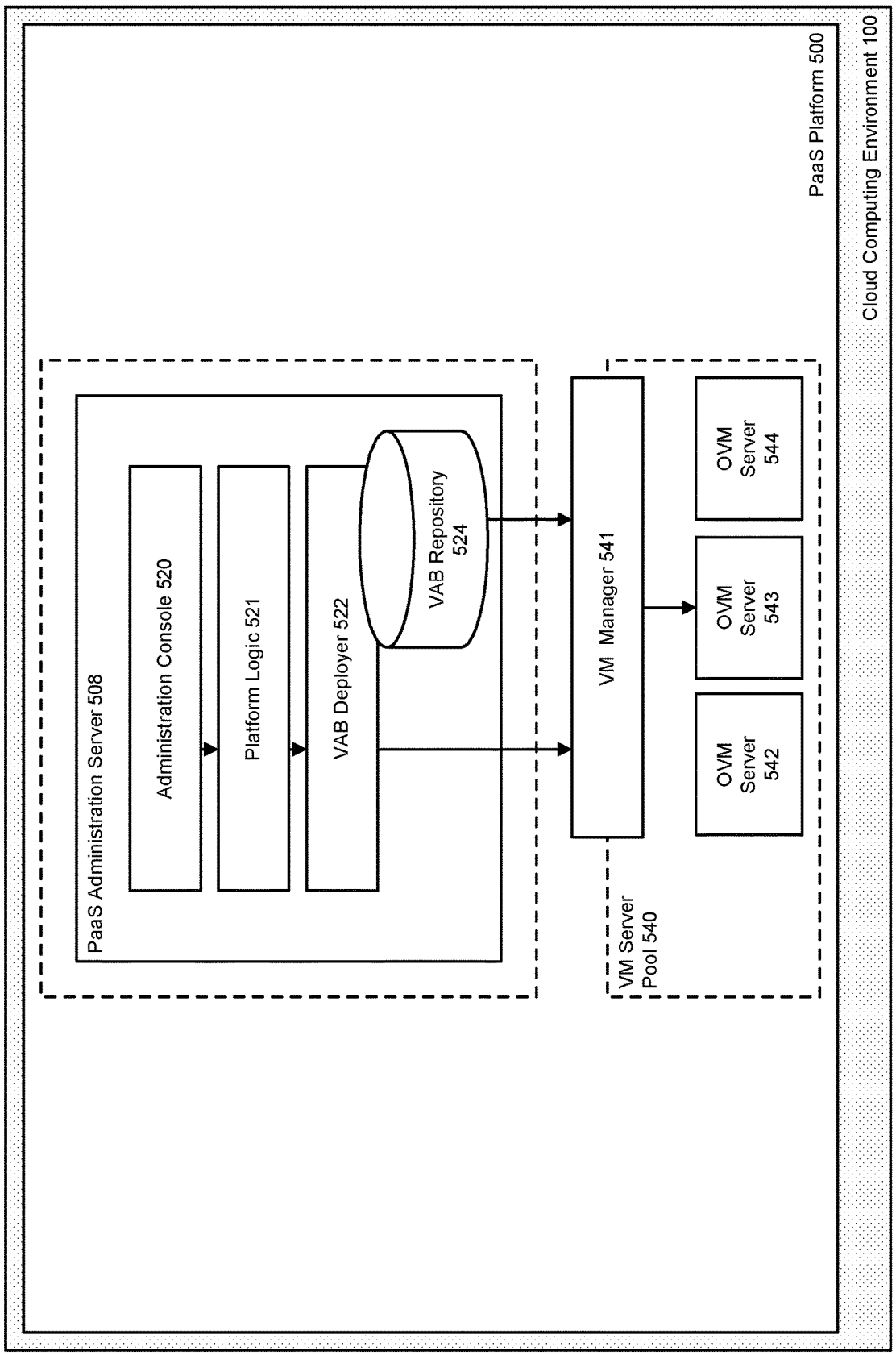

FIG. 6 further illustrates a PaaS platform component, including the interaction between an administration server and a virtualization manager, in accordance with an embodiment. As shown in FIG. 6, in accordance with an embodiment, a VM manager component 541 (e.g., OVM Manager) can be used by the PaaS platform to manage the pool 540 of VMs 542, 543, 544, which are then used in instantiating a service assembly.

When a request is made from a PaaS platform module to instantiate an assembly (or a single appliance in the case of a scale-up request), the VAB deployer application (e.g., OVAB Deployer) can then interact with the VM manager (e.g., OVM Manager) to fulfill the request. By delegating the infrastructure/virtualization responsibilities to the VM manager and the VAB deployer in this manner, the PaaS platform can be abstracted from the target deployment platform.

Figure 7:
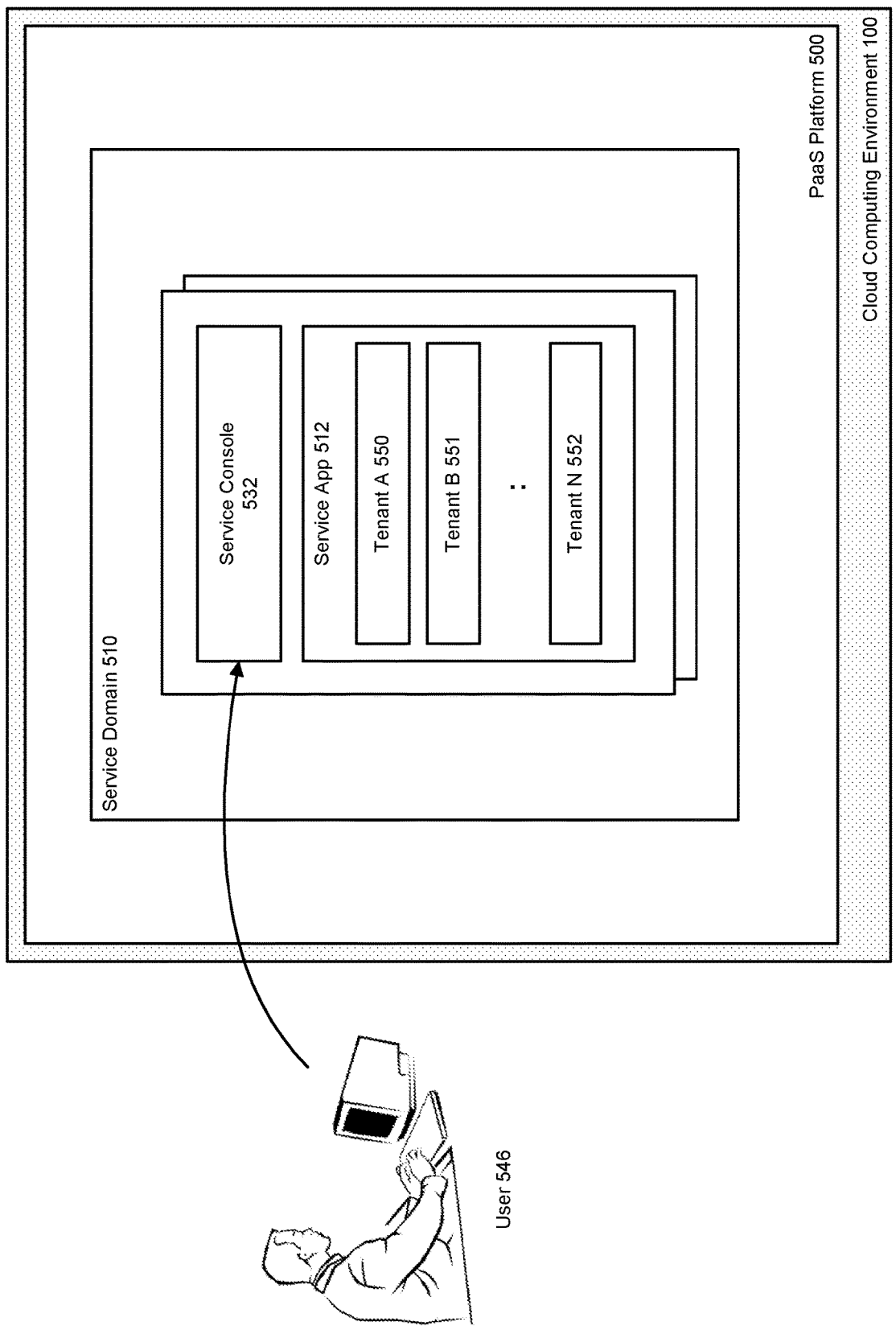

FIG. 7 further illustrates a PaaS platform component, including a multiple tenant service domain, in accordance with an embodiment.

As shown in FIG. 7, a service domain can include multiple tenants 550, 551, 552, that are configurable using the service console. Multi-tenancy, like virtualization, is a density optimization that allows the use of less resources to support more clients and, similar to virtualization, should be transparent to the applications themselves. Although multi-tenancy involves the use of shared resources, the sharing need not be part of the logical model of the applications. These models are referred to as using "multitenant" and "dedicated" resources.

Separately, applications may also share resources in a way that is part of the logical model of the applications. For example, two applications may purposely access a shared database because they intend to operate on the same data. These models are referred to as using "shared" and "unshared" resources.

In accordance with an embodiment, some service types may support both dedicated and multitenant uses, based on their particular configuration. Other service types may support either only dedicated use, or only multitenant use. Service types that are able to support multiple tenants on the same runtime can provision their runtimes in a multitenant manner during the instantiation process, based on the configuration of the service type. A single instantiated service runtime that has been marked as multitenant-capable will be reused for a finite number of additional service provisioning requests, as determined by the service type and based on its configuration. Generally, it is left to the service application to support this tenancy mode; service applications that are not multitenant will only be able to support a single account for each service instance.

Once a service has been instantiated from its VM assembly, end users 546 can then interact with the system and the instantiated services in the same manner as they would interact with an on-premise version of that service.

Figure 8:
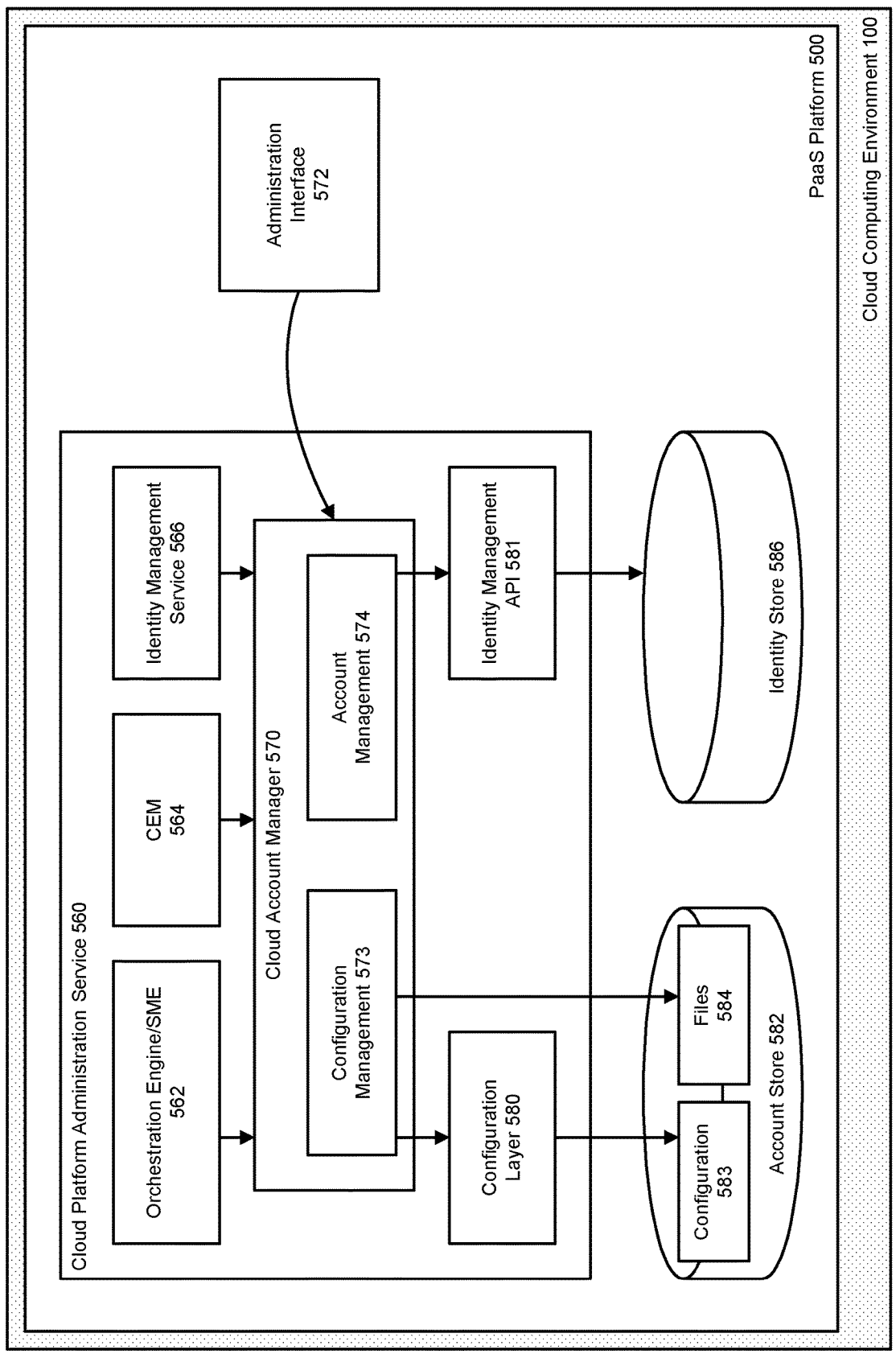
FIG. 8 further illustrates a PaaS platform component, including a cloud account manager, in accordance with an embodiment FIG. 9 further illustrates use of a service definition package with a PaaS platform component, in accordance with an embodiment.

FIG. 8 further illustrates a PaaS platform component, including a cloud account manager, in accordance with an embodiment. As shown in FIG. 8, in accordance with an embodiment, the PaaS platform can include a cloud platform administration service (CPAS) 560, together with a cloud account manager 570 which is responsible for supporting functions such as account management, and for providing a framework that other modules of the PaaS platform (e.g., the orchestration engine/SMEs 562, CEM 564, or identity management service 566) can use to access or persist account-specific data.

In accordance with an embodiment, a configuration management component 573 can use a configuration layer 580 to persist account specific configuration 583 and other files 584 to an account store 582, which then enables the various services and other components of the CPAS to access and manipulate account-specific data.

In accordance with an embodiment, an account management module 574 also provides the ability to manage accounts for a CPAS domain. This can be exposed through the use of a command-line, REST, or other identity management application program interface (API) 581. Each account can have multiple users. In accordance with an embodiment, the users can either be managed in an identity store 586 managed by the PaaS platform, or alternatively can be provided from an external (e.g., corporate) LDAP, or from another means of user identification.

In accordance with an embodiment, users can access the cloud account manager through an administration interface 572. The account and configuration data can also be stored on a file system or other means of storage that is accessible from all nodes of a CPAS cluster.

Service Definition Package (SDP)

Figure 9:
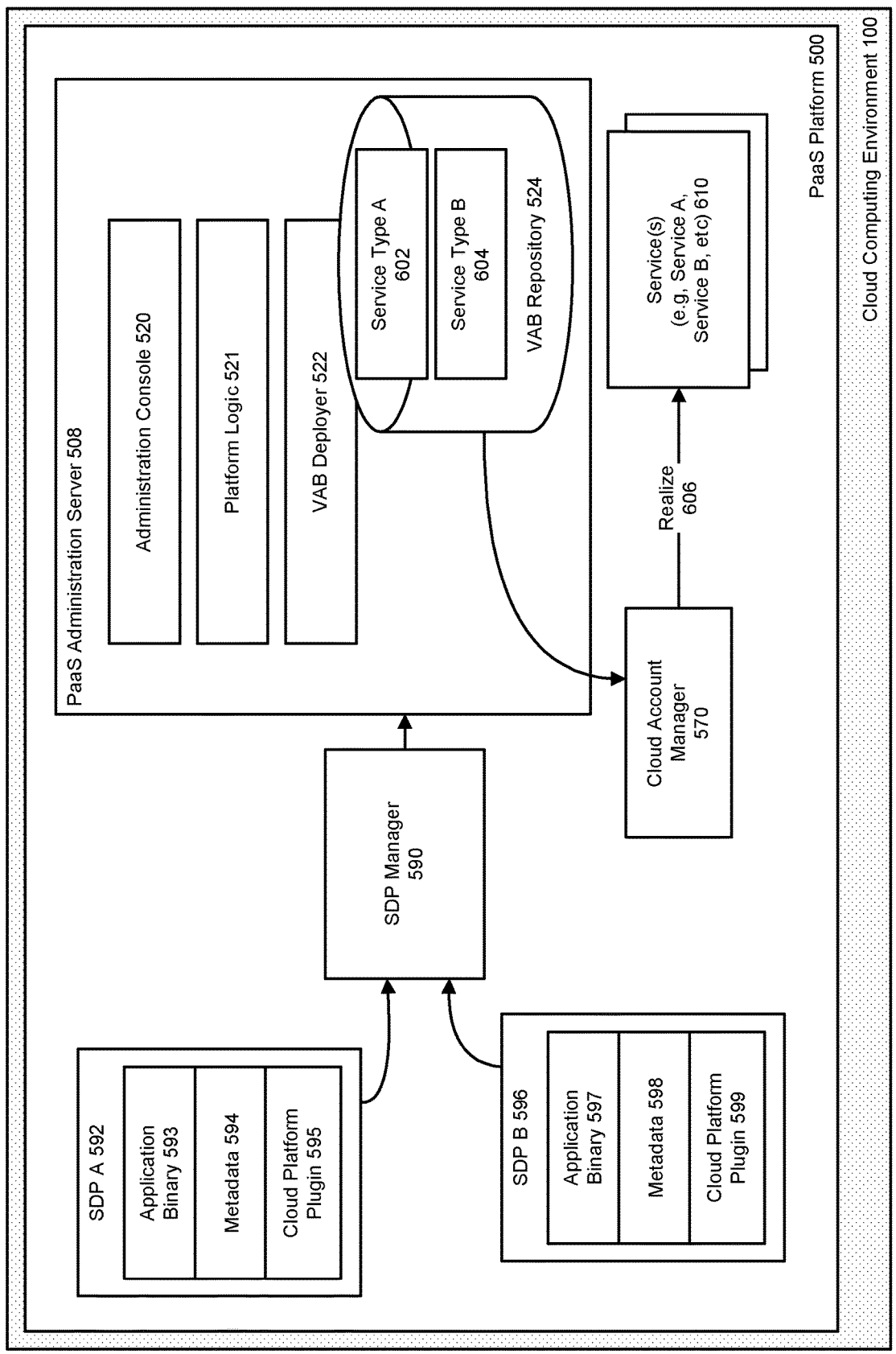

FIG. 9 further illustrates use of a service definition package with a PaaS platform component, in accordance with an embodiment. In accordance with an embodiment, a Service Definition Package (SDP) is the means by which a particular enterprise application component (e.g., a Fusion Middleware component) is delivered as a service type into the PaaS platform.

In accordance with an embodiment, an SDP generally has the following characteristics: it can be easily created for a particular enterprise application component; it can be deployed to various virtualization technologies (e.g., OVM, Amazon, KVM, or VirtualBox); it can be deployed to non-virtualized environments (e.g., laptop mode); and it includes support for pre-provisioned service types or providers.

As shown in FIG. 9, in accordance with an embodiment, each SDP 592, 596 can include a binary 593, 597; a metadata 594, 598 (e.g., the SDP name, service type, version, vendor, or virtualization support metadata such as indicating whether the SDP supports OVAB, EC2, or Native); and one or more plugins 595, 599 that enable the SDP to be used within a PaaS platform or cloud environment. In accordance with an exemplary embodiment, each SDP can also include:

An assembly, reference, package, archive or template, which can be used to install a service on a particular virtualization provider (e.g., OVAB); an assembly bundled within the SDP; or a reference to an assembly (e.g., an EC2-specific reference).

A service management plugin or SME plugin for the service type, which enables PaaS platform functionality such as elasticity metric gatherers, or alerts to be used with the service.

A plugin for use with a VAB deployer (e.g., OVAB Deployer) during its assembly rehydration process.

Dependency information regarding service providers, such as association rules or other artifacts for association;

for example, an association with a database provider may require information such as a database schema, or appropriate tables.

Configuration metadata, which in some instances may be further subdivided into service configuration and service runtime configuration metadata.

Access interfaces, such as service administration interfaces or URL patterns for use by a service administrator (e.g., a WLS admin server URL).

Quality of service metadata, for use with the service and its runtimes.

Scalability metadata, such as scalability limits for different components; for example, the scalability limits for different appliances within an assembly can be defined, and these scalability limits exposed to the system administrator or cloud account administrator and the elasticity manager, for appropriate scaling and handling.

An indication of supported tenancy model, such as whether the service is a multitenant or dedicated service.

Security template/credentials for use with the service.

The above description of an exemplary embodiment of SDP contents is provided as an illustration of some of the types of information which can be included in an SDP. In accordance with other embodiments, different and/or other types of information can be included in an SDP.

In accordance with an embodiment, for a PaaS system administrator to provide support for a particular enterprise application or other software component as a service type, the system administrator can download an SDP for the particular service type, and install the SDP to the PaaS platform.

In accordance with an embodiment, installing an SDP will install, e.g., the OVAB assembly into the OVAB repository; appropriate SME plugins will be registered with the cloud platform; and metric gatherers, alerts and actions will be installed in the PaaS platform. After the system administrator installs the SDP, a cloud account administrator can then use the cloud account administration interface to request for a service of that type. A service is the realization of a particular service type.

For example, in the context of Fusion Middleware components, each version of a Fusion Middleware component can have a separate SDP. When a cloud account administrator/service administrator wants to upgrade to a new version of a Fusion Middleware component, they can select a new version of the SDP. For example, to be able to support SOA suite 11g, and SOA suite 12.1.3, there can be separate SDPs for these two versions of the SOA suite product.

In accordance with an embodiment, an SDP can be packaged as a zip or a jar file, for example:

<SDP Name~>.zip
→.ova (OVAB assembly if bundled)
→sme-plugin.jar (includes elasticity components)
→service-definition.xml (metadata for the service)

An SDP can also be packaged as other file formats, depending on the particular implementation. As shown in FIG. 9, In accordance with an embodiment, when an SDP installed into a PaaS platform domain, it is subsequently consumed by the SDP Manager 590, which is responsible for obtaining a list of SDPs that are available to be installed the local system; downloading an SDP if necessary, and installing the parts of the SDP into the right places; maintaining a list of those SDPs that have been installed; and, if necessary, uninstalling an SDP by uninstalling all of its parts from the places where they are/were previously installed.

In accordance with an embodiment, the SDP manager supports multiple versions of a given SDP (e.g., SOA 11 and SOA 12), in addition to patching of an existing version of an SDP. Generally, when an SDP is patched (as described in further detail below), this will only affect the installed components related to the SDP in the PaaS infrastructure; it will not affect the services of that service type.

In accordance with an embodiment, the SDP manager isolates the PaaS system from the format of the SDP file. No other parts of the PaaS platform architecture need be aware of the precise SDP file format. The SDP manager can interface with other system components by installing an SME plugin to the CPAS, which can then take responsibility for replicating the SME plugin to other CPAS instances in the cluster; installing the VAB assembly 602, 604 (e.g., an OVAB assembly) into the VAB deployer (e.g., OVAB Deployer); interfacing with other tools such as Enterprise Manager to provide a customized console interface for the service if the service provides one; and, installing configuration data for the service into the CPAS.

Subsequently, during realization 606 of a service, the service 610 can be realized as an instance of those service types defined by the SDP and installed as assemblies in the VAB repository.

Figure 10:
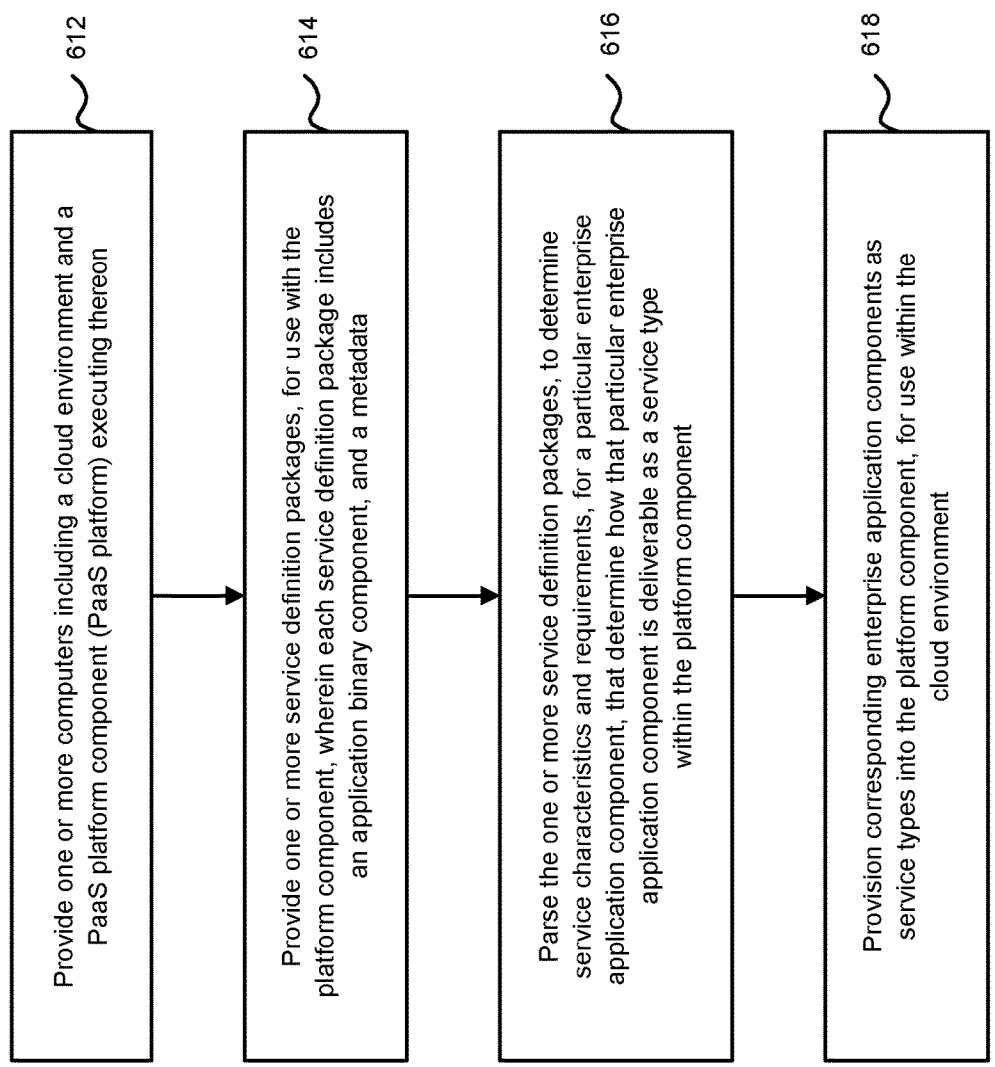
FIG. 10 is a flowchart of a process for using a service definition package with a PaaS platform component, in accordance with an embodiment.

FIG. 10 is a flowchart of a process for using a service definition package with a PaaS platform component, in accordance with an embodiment. As shown in FIG. 10, at step 612, one or more computers are provided, including a cloud environment and a PaaS platform component (PaaS platform) executing thereon.

At step 614, one or more service definition packages are provided for use with the platform component, wherein each service definition package includes an application binary component, and a metadata.

At step 616, the one or more service definition packages are parsed to determine service characteristics and requirements, for a particular enterprise application component, that determine how that particular enterprise application component is deliverable as a service type within the platform component.

At step 618, corresponding enterprise application components are provisioned as service types into the platform component, for use within the cloud environment.

Service Management Engine (SME)

Figure 11:
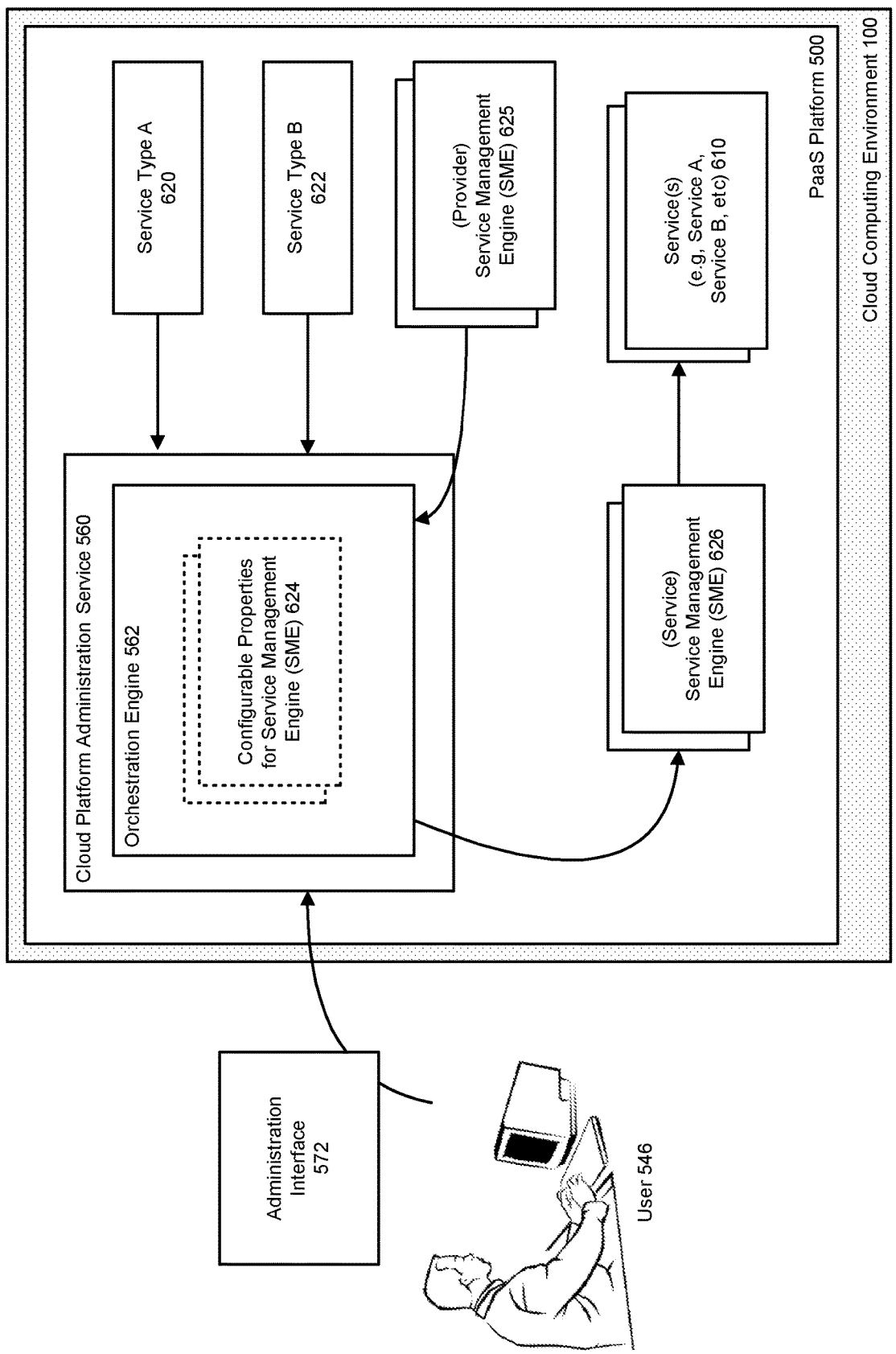
FIG. 11 further illustrates use of a service management engine with a PaaS platform component, in accordance with an embodiment.

FIG. 11 further illustrates use of a service management engine with a PaaS platform component, in accordance with an embodiment.

Generally described, in accordance with an embodiment, a Service Management Engine (SME) provides a generic means to plug any service type into the system. For example, an SME takes care of all of the service-specific provisioning, lifecycle, management, and monitoring support for a service type or provider type. The orchestration engine (OE, as described in further detail below), being service-agnostic, depends completely on the SME to handle all service-related actions.

In accordance with an embodiment, within a PaaS platform domain, there can be several different classes of SMEs. For example, provider SMEs can be provided to handle different providers that are supported in the PaaS platform domain. Examples of the types of providers that can be supported include Database, Web-Tier, and Identity-Management providers. In accordance with an embodiment, a provider SME is configured to point to an existing external service within the enterprise, by creating a provider type from the provider SDP. The provider SME is also responsible for all actions such as schema management that may be required as part of association and dissociation with the service being created. Provider SMEs are generally not configured to handle provisioning, unprovisioning, or management of the external service pointed to by the provider type; although provider SMEs could be configured to do so.

In accordance with an embodiment, service SMEs can be added to the PaaS platform domain using an SDP. For example, a service SME can be dynamically incorporated into the PaaS platform domain by installing an appropriate SDP. In accordance with an embodiment, the SDP manager handles the installation/registration of service SMEs bundled in SDPs with the PaaS platform domain. The set of registered service SMEs then become the service types that are available to cloud account administrators to create services.

In accordance with an embodiment, each service type supported in the PaaS platform domain maps to a specific service SME. A service SME handles all service related activities, such as spanning creation, monitoring, management, patching, upgrade, and deletion for that service. In accordance with an embodiment, the contract that is implemented by an SME is referred to as a Service Management Interface (SMI), which defines the support for monitoring, patching and upgrade of the service.

In accordance with an embodiment, the orchestration engine interacts with the provider and service SMEs to create a service in a PaaS platform domain. The orchestration engine choreographs the creation of service; however all service level activities are handled by SMEs. In the example shown in FIG. 11, when OVAB is used as a virtualization provider, all interaction with the OVAB Deployer is handled by a Virtualization API (e.g., an OVAB client API). In accordance with an embodiment, the orchestration process can then proceed as follows:

A cloud account administrator discovers, e.g., SOA service types 620, 622 that are available in the PaaS platform domain, and initiates the creation of, in this example, an SOA service.

The orchestration engine iterates through all of the available service SMEs in the system, and determines which service SMEs can handle this service type 624. In this example, the orchestration engine will discover, in this example, the SOA SME to handle creation of the SOA service.

The orchestration engine then calls into the SOA SME to get all provider dependencies for that SME 625. In this example, the SOA SME returns database and load-balancer provider dependencies.

The orchestration engine then calls a get-user or similar configurable properties function for the SOA SME, and exposes those properties in a user interface or GUI, so that the cloud account administrator can edit the properties as desired.

User-provided inputs are then supplied to the SOA SME. Since in this example OVAB is being used, the user provided inputs can be used to update the OVAB deployment plan.

The orchestration engine performs any pre-provisioning association between the SOA SME and the provider SMEs upon which it depends. For example, the orchestration engine will perform pre-provisioning association between the SOA SME and database provider SME, which results in creation of schema and tables as required by the SOA service, in addition to populating the deployment plan with the database provider configuration.

Once any pre-provisioning association is complete, the orchestration engine then calls into the SOA SME 626 to provision the SOA service. At this point, the deployment plan is generally complete except for network configurations. The updated deployment plan together with an assembly ID can be pushed to the OVAB API, which takes care of filling the deployment plan with the remaining network configurations. Then, the orchestration engine can call the web service API of the OVAB deployer to provision the OVAB assembly. Once the assembly is provisioned, all of the virtual machine information is retrieved and passed back to the SOA SME, which in turn passes this information back to the orchestration engine. The orchestration engine may persist this information for later use.

The orchestration engine then performs any post-provisioning association between the SOA SME and the provider SMEs on which it depends. For example, post-provisioning association between the SOA SME and load-balancer provider SME may result in virtual server creation to handle requests for this SOA service and appropriately route them.

Finally, the status of the service creation is returned back to the cloud account administrator.

The above description of an orchestration process, using OVAB Deployer as a means of deploying assemblies, a SOA service and SOA SME as an example SME, and association with database and load-balancer providers, is provided to illustrate an exemplary orchestration process. In accordance with other embodiments, different and/or other types of, e.g., VAB deployer, SME, and providers can be used.

Figure 12:
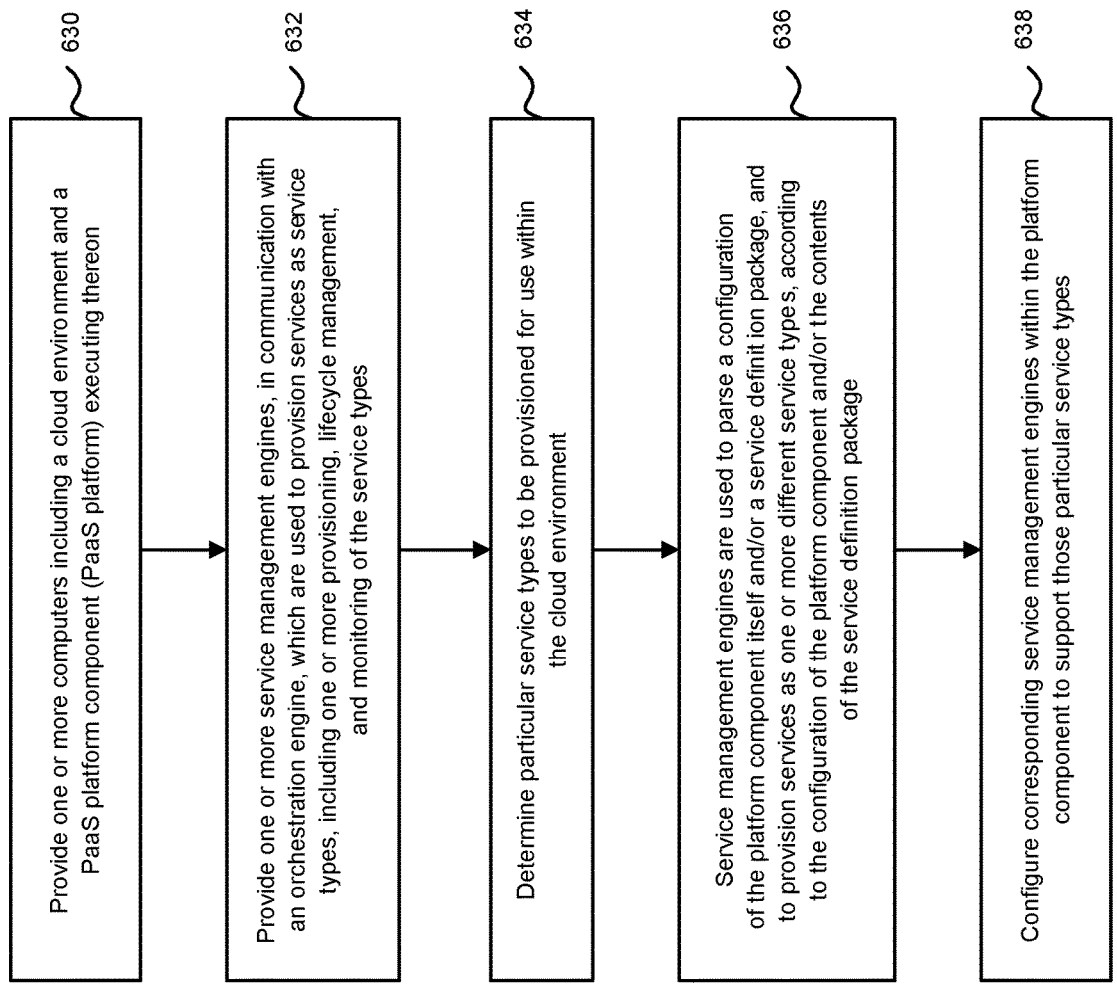
FIG. 12 is a flowchart of a process for using a service management engine with a PaaS platform component, in accordance with an embodiment.

FIG. 12 is a flowchart of a process for using a service management engine with a PaaS platform component, in accordance with an embodiment. As shown in FIG. 12, at step at step 630, one or more computers are provided, including a cloud environment and a PaaS platform component (PaaS platform) executing thereon.

At step 632, one or more service management engines are provided in communication with an orchestration engine, which are used to provision services as service types, including one or more provisioning, lifecycle management, and monitoring of the service types.

At step 634, particular service types are determined to be provisioned for use within the cloud environment.

At step 636, service management engines are used to parse a configuration of the platform component itself and/or a service definition package, and to provision services as one or more different service types, according to the configuration of the platform component and/or the contents of the service definition package.

At step 638, corresponding service management engines are configured within the platform component to support those particular service types.

Orchestration Engine

Figure 13:
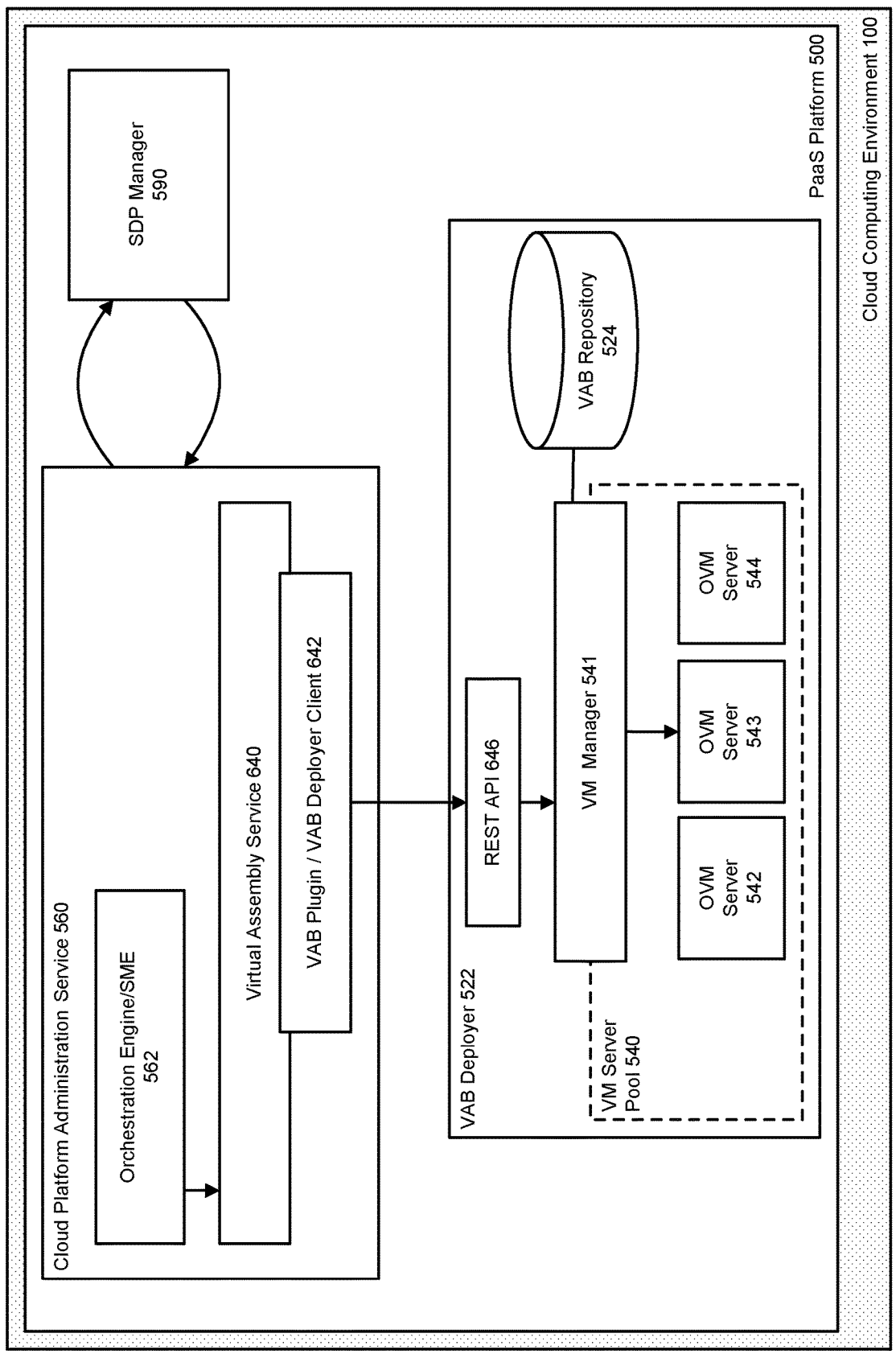
FIG. 13 further illustrates use of an orchestration engine with a PaaS platform component, in accordance with an embodiment.

FIG. 13 further illustrates use of an orchestration engine with a PaaS platform component, in accordance with an embodiment.

In accordance with an embodiment, the orchestration engine (OE) enables service creation, provider dependency resolution, association of services and providers, and generally the end to end life-cycle management of the services in the PaaS platform. In particular, the orchestration engine coordinates all of the interactions among various components in the PaaS platform domain while creating or managing a service; enables the pluggability of SMEs for various service types in the platform; and aids in provisioning the service by selecting appropriate SMEs from among those available in the platform. The orchestration engine also helps in managing the configuration of providers such as DB Providers, IDM Providers, and LB Providers.

In accordance with an embodiment, the orchestration engine, as part of creating a service, ensures that all of the dependencies of the service, such as its provider dependencies are satisfied, by selecting appropriate providers (provider SMEs), and coordinating the association between the providers and service. The act of association can be performed during pre-provisioning and/or post provisioning-phases. The act of installing and configuring an SME can be performed by the SDP manager as part of registering a pre-packaged service type or a customized service type. The orchestration engine helps expose the deployment plan configuration, which can be configured by the cloud account administrator through the console during the act of provisioning the service.

In accordance with an embodiment, the orchestration engine recognizes a set of phases and tasks that match the requirements of the PaaS platform for its "service creation" action and other life-cycle related activities. The orchestration engine is also designed to be extensible and to allow the configuration of phases and tasks in all actions that are managed by the orchestration engine.

Provisioning and managing a service in a virtualized environment is often a time-consuming action and generally needs to be performed in an asynchronous fashion. The system must also be able to handle any transient (or retry-able) failures, and continue with the provisioning activity. In accordance with an embodiment, the administrator can query or monitor any of these asynchronous activities on demand. A unique identifier can also be provided for actions such as provision, unprovision etc., in order to determine, display and record the progress status of all initiated actions.

In accordance with an embodiment, the orchestration engine also helps to retry a task, or rollback an action based on the resiliency of the task, where the task or phase can have markers (annotations) to indicate the resiliency level and any compensating act.

In accordance with an embodiment, the orchestration engine acts as a gateway for all service management, monitoring, scaling actions that could be initiated by other containers in the PaaS platform domain, or by the administrator. For example, the elasticity engine (as described in further detail below) communicates with the orchestration engine to manage, monitor, and scale services based on a service's QoS configuration. The orchestration engine can also play a role in service maintenance actions, such as patching and upgrade, which can be performed in an active system in a rolling fashion that helps avoid down time of the service. Such actions may require disassociating or re-associating services in a phased manner.

In accordance with an embodiment, services created by a cloud account administrator are visible and accessible only to that particular cloud account (tenant), and are isolated from other cloud accounts in the PaaS platform domain. In accordance with an embodiment, such isolation can be provided by the orchestration engine with the help of a cloud account management module. Storing and managing service configuration, status, and accessibility are achieved by having separate cloud account data stores. Both multitenant and dedicated tenancy models can be supported within a platform domain. The orchestration engine, based on the preference provided in the service metadata, selects an appropriate provider type that supports the required tenancy level. Similarly, multitenant and dedicated tenancy models can be supported for services based on multitenant service runtimes, or on a dedicated service runtime per service.

In accordance with an embodiment, SMEs can be registered with the orchestration engine such that multiple SMEs for a given "family" of service (e.g., "database") can be present in the system. It is also possible to configure a default SME for a particular service family on a per-cloud account basis.

As shown in FIG. 13, in accordance with an embodiment, the virtualization features for CPAS are primarily built around the VAB deployer (e.g., OVAB Deployer), with VAB assemblies (e.g., OVAB Assemblies) being the unit of provisioning. In accordance with other embodiments, the CPAS can support alternative virtualization solutions.

In accordance with an embodiment, the orchestration and service management components can interface with the virtualization layer through a virtualization service 640, plugin 642, and a virtualization API 646 that abstracts the basic virtualization operations supported. In accordance with an embodiment that uses OVAB, this API can be an OVAB Deployer interface, which allows OVAB Deployer to perform the tasks of assembly creation. Products such as OVAB support virtualization providers such as OVM, in addition to computer hardware machines such as ExaLogic. Products such as OVAB Deployer also provide an SPI that allows the development of plugins to support additional virtualization technologies, such as EC2. In accordance with an embodiment, the orchestration engine/SME can upload and deploys assemblies through the OVAB Virtualization API, in addition to managing their lifecycle.

To support developer/demo scenarios, in accordance with an embodiment, the system can also implement a limited solution that can run on native OS processes (i.e., with no virtualization). This capability can be implemented by providing a physical plugin that implements a portion of the Virtual Assembly Service API.

Figure 14:
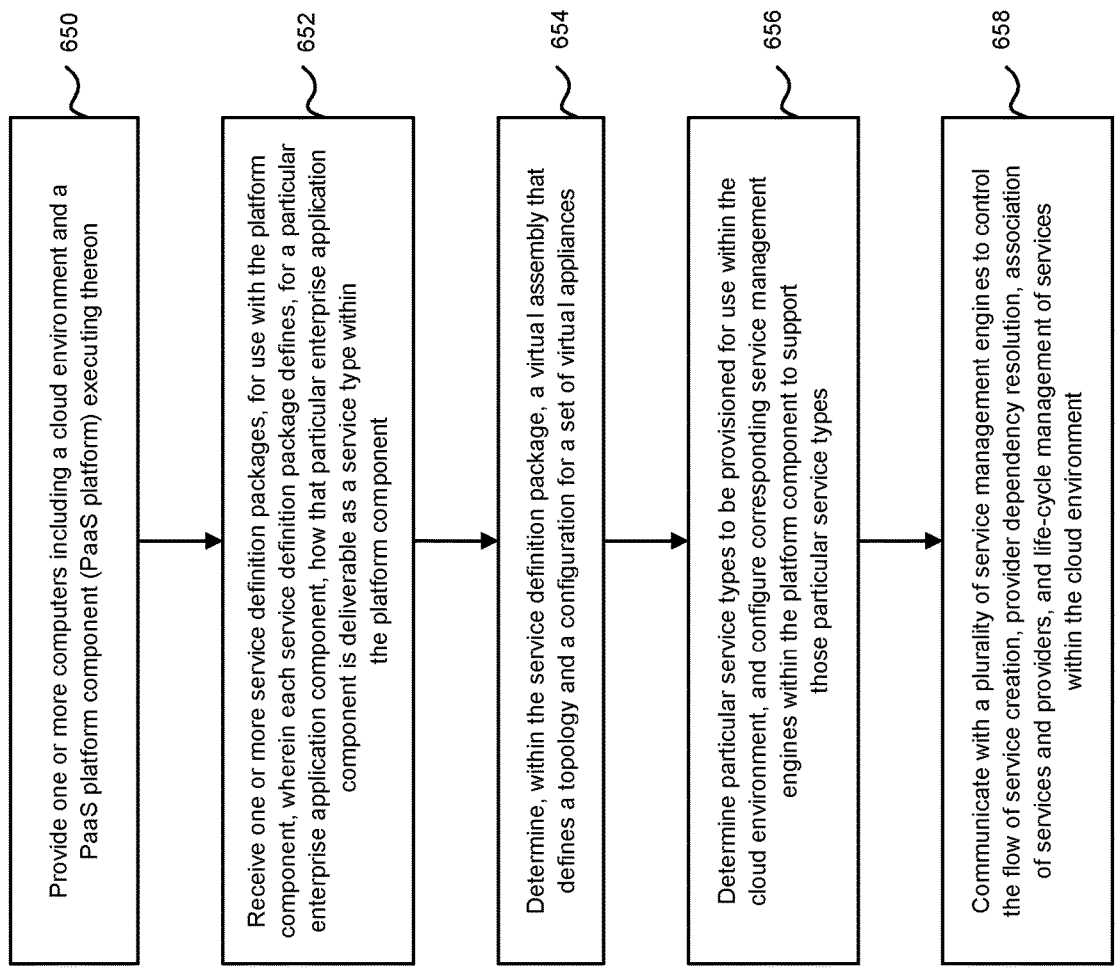
FIG. 14 is a flowchart of a process for using an orchestration engine with a PaaS platform component, in accordance with an embodiment.

FIG. 14 is a flowchart of a process for using an orchestration engine with a PaaS platform component, in accordance with an embodiment. As shown in FIG. 14, at step at step 650, one or more computers are provided, including a cloud environment and a PaaS platform component (PaaS platform) executing thereon.

At step 652, one or more service definition packages are received, for use with the platform component, wherein each service definition package defines, for a particular enterprise application component, how that particular enterprise application component is deliverable as a service type within the platform component.

At step 654, the process determines, within the service definition package, a virtual assembly that defines a topology and a configuration for a set of virtual appliances.

At step 656, particular service types are determined to be provisioned for use within the cloud environment, and corresponding service management engines configured within the platform component to support those particular service types.

At step 658, the process communicates with a plurality of service management engines to control the flow of service creation, provider dependency resolution, association of services and providers, and life-cycle management of services within the cloud environment.

Elasticity Manager

Figure 15:
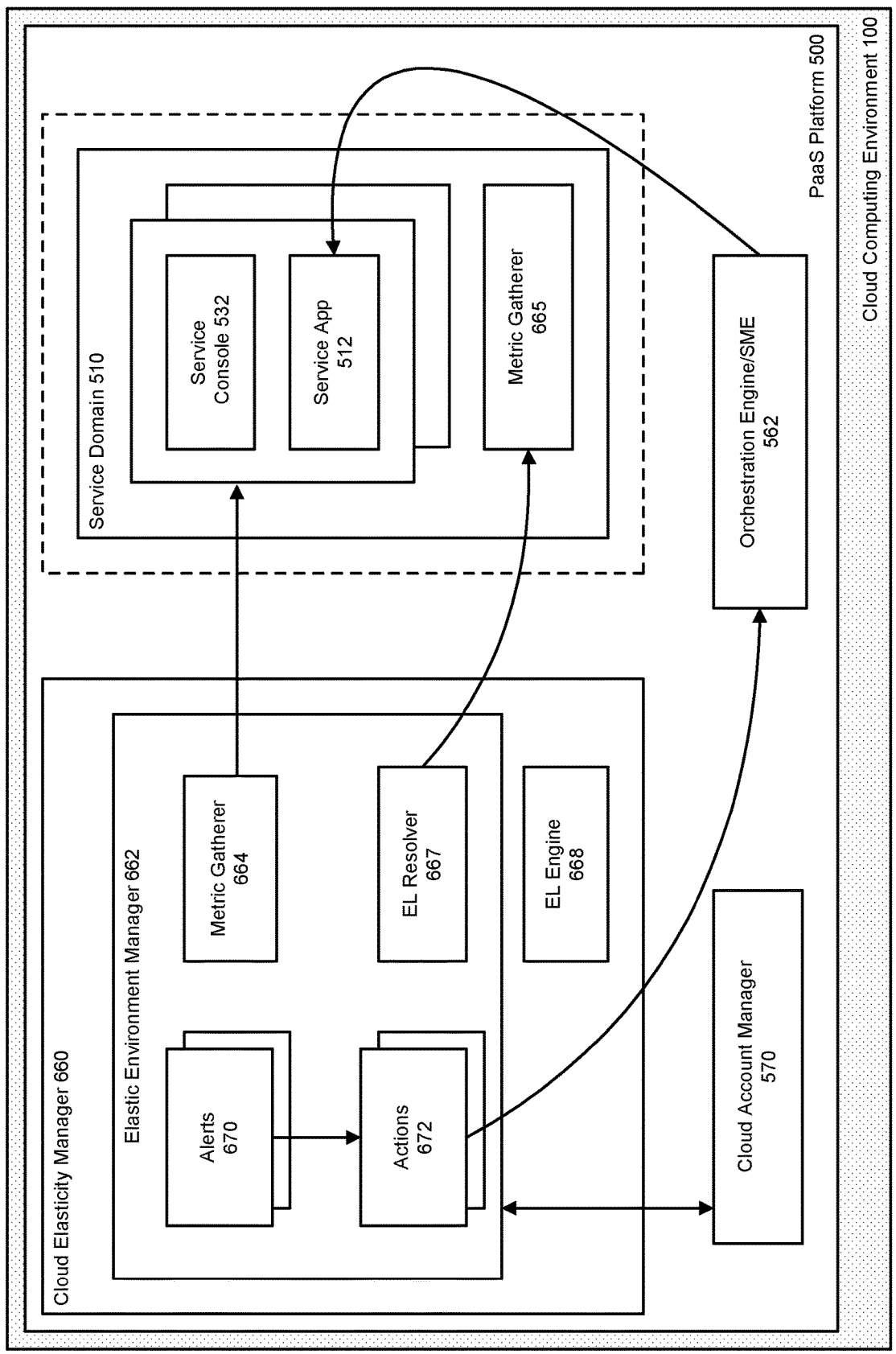
FIG. 15 further illustrates use of an elasticity manager with a PaaS platform component, in accordance with an embodiment.

FIG. 15 further illustrates use of an elasticity manager with a PaaS platform component, in accordance with an embodiment.

As shown in FIG. 15, in accordance with an embodiment, the cloud elasticity manager 660, including an environment manager 662, can use metric gatherers 664, 665 and alerts 670, to determine the health of services running in an environment. Once the state of the environment is determined, the cloud elasticity manager can take appropriate actions 672. In accordance with an embodiment, the metric gatherers, alerts and actions can be provides as HK2 contracts, such that the set of metric gatherers, alerts and actions are extensible.

In accordance with an embodiment, a metric gatherer is an object that collects and maintains metric data about a service periodically. For example, a metric gatherer may periodically collect heap statistics such as used memory and committed memory. Another metric gatherer can periodically gather metrics about CPU usage. Generally, the metric gatherers provide information about the state of some resource usage. Metrics can also be provided by external monitoring tools and need not be metric gatherer objects. In accordance with an embodiment, the cloud elasticity manager allows any Java bean component to provide metrics data for use in generating alerts.

In accordance with an embodiment, an alert object periodically checks the health of a service in an environment by analyzing metric data gathered by one or more metric gatherers over a period of time. For example, an alert may examine the CPU usage for the past 10 minutes to determine if the environment is under stress. After the alert determines the state of the service or environment, it can execute some action, such as: sending an email; logging a message; sending an event; or scaling-up or scaling-down a service. In accordance with an embodiment, an alert can take multiple actions.

In accordance with an embodiment, the cloud elasticity manager can include a unified Expression Language (EL) engine 668 that allows alerts to be specified as EL expressions. EL expressions can also use metric gatherers and alerts in their expressions. In accordance with an embodiment, the cloud elasticity manager also allows external EL Resolver objects 667 to be registered; which allows other types of objects such as MBeans or POJOs to be used in an expression.

Metric gatherers, alerts and actions typically require some configuration data. For example, a metric gatherer may require some configuration data that specifies the duration of time metric data should be kept. Similarly, alerts may require some configuration data that specifies the threshold value. In accordance with an embodiment, the cloud elasticity manager relies on the cloud account manager to persist such configuration data. Again, configuration data can be based on HK2, thereby allowing easy extensibility.

Figure 16:
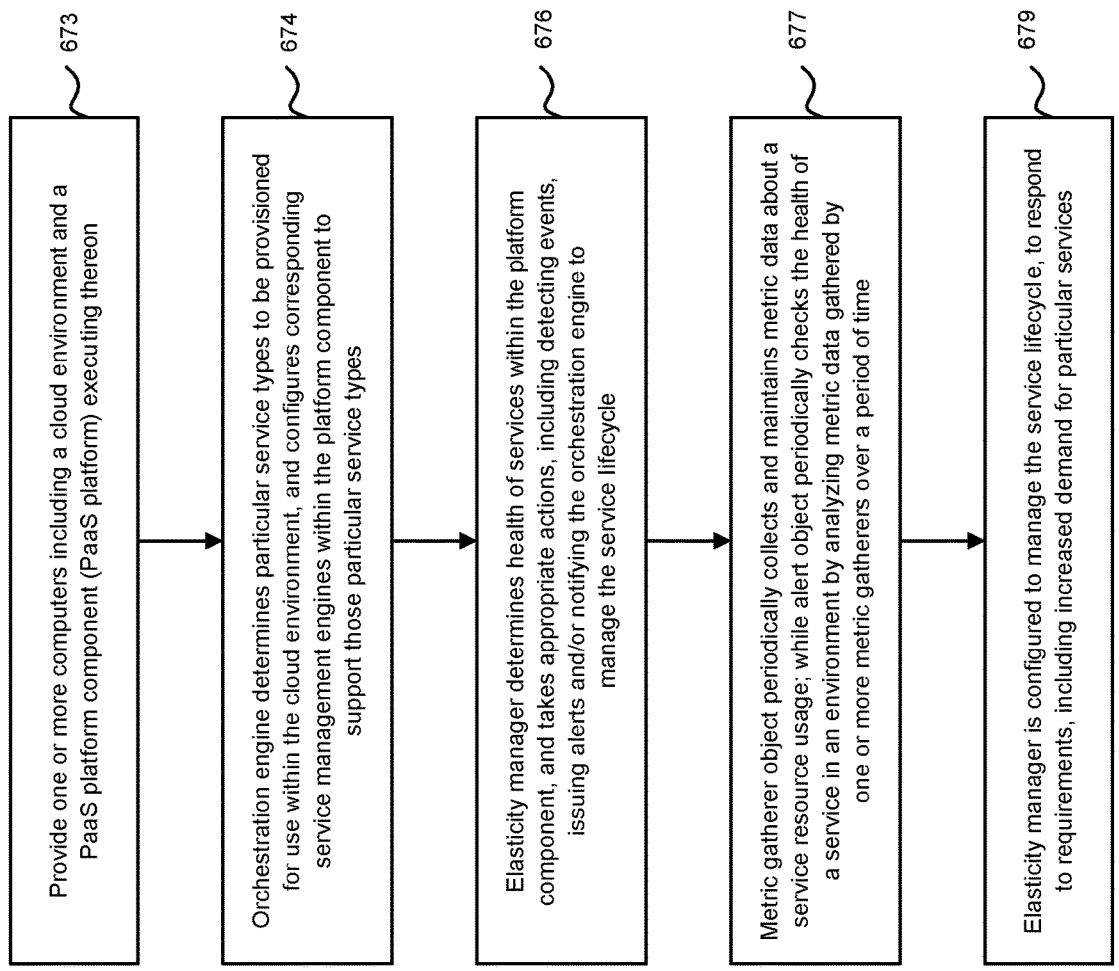
FIG. 16 is a flowchart of a process for using an elasticity manager with a PaaS platform component, in accordance with an embodiment.

FIG. 16 is a flowchart of a process for using an elasticity manager with a PaaS platform component, in accordance with an embodiment. As shown in FIG. 16, at step at step 673, one or more computers are provided, including a cloud environment and a PaaS platform component (PaaS platform) executing thereon.

At step 674, the orchestration engine determines particular service types to be provisioned for use within the cloud environment, and configures corresponding service management engines within the platform component to support those particular service types.

At step 676, the elasticity manager determines health of services within the platform component, and takes appropriate actions, including detecting events, issuing alerts and/or notifying the orchestration engine to manage the service lifecycle.

At step 677, one or more metric gatherer object periodically collects and maintains metric data about a service resource usage; while one or more alert object periodically checks the health of a service in an environment by analyzing metric data gathered by one or more metric gatherers over a period of time.

At step 679, the elasticity manager is configured to manage the service lifecycle, to respond to requirements, including increased demand for particular services.

Updating and Patching of SDPs

Figure 17:
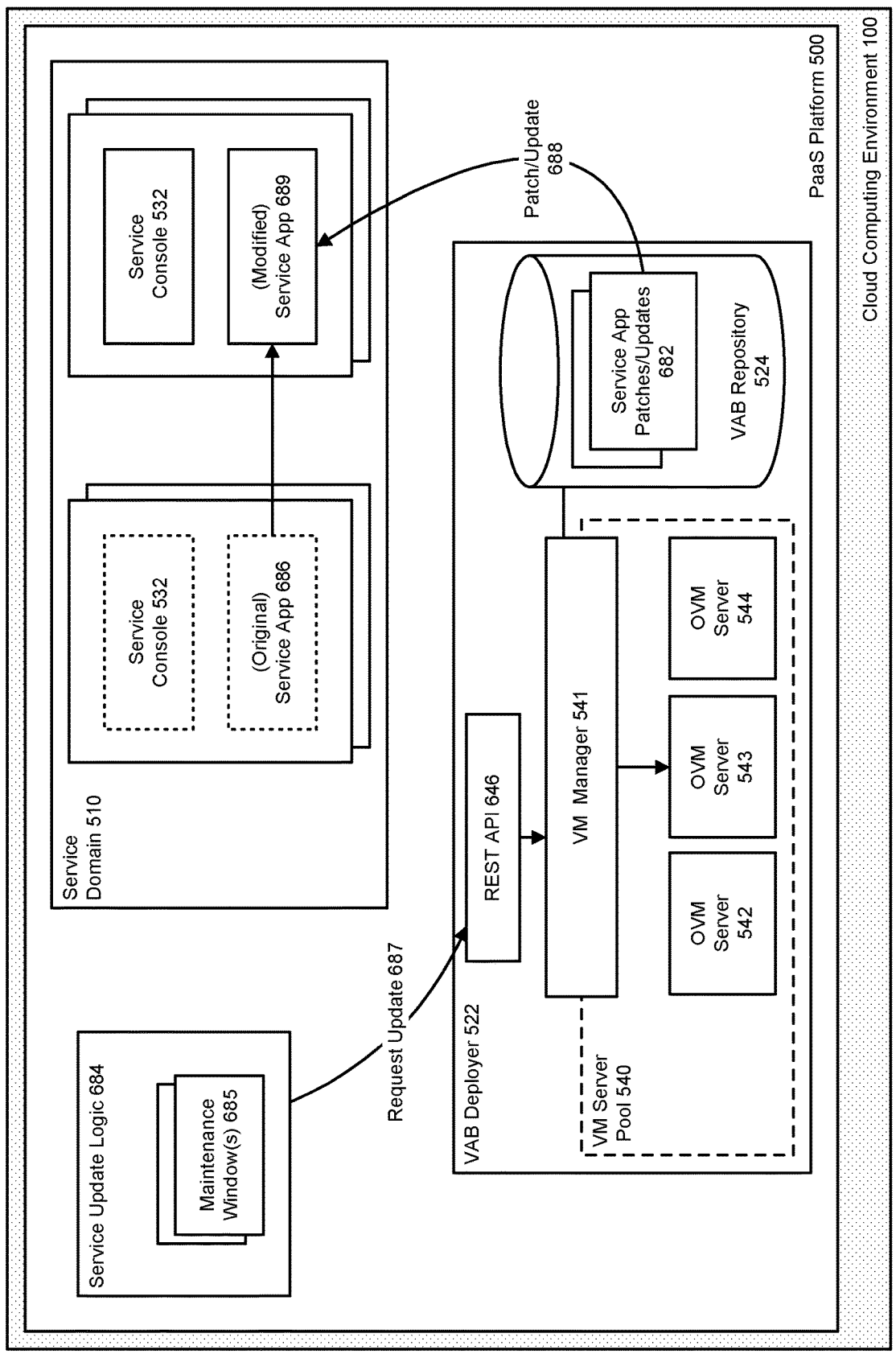
FIG. 17 further illustrates patching of service definition packages with a PaaS platform component, in accordance with an embodiment.

FIG. 17 further illustrates patching of service definition packages with a PaaS platform component, in accordance with an embodiment. In accordance with an embodiment, services can be periodically maintained to ensure that they are up-to-date with, e.g., bug fixes, security updates and configuration changes. To help ensure homogeneous environments, services should be updated in a timely manner, with the same set of patches and configuration updates.

In accordance with an embodiment, an update is defined to be a change which has to be made to the system. Examples of updates include an application of a security patch, upgrade of a component, or changing of a configuration value. Depending on the type of update, some updates may require a downtime, while other updates may not require a downtime. The system can take both of these situations into account.

In accordance with an embodiment, updates can include hard updates—an update which requires a service downtime (e.g., patches to middleware, operating system (OS) updates etc.), or a service reboot; and soft updates—an update which does not require system downtime (e.g., some configuration changes).

Soft updates avoid a downtime, but at the expense of service stability. To this extent, it is important that the system administrator categorizes updates properly. It is also important that all services are updated to keep the environment homogeneous, and that maintenance windows are restricted to ensure that all of the services are updated properly.

In accordance with an embodiment, a maintenance window is defined as a time frame when updates will be applied to a particular service. A different maintenance window can be different for different services. Generally, one or more of the following actions will happen during the maintenance window, depending on the update type: lockout the service (typically only for hard update); backup the service; apply and or all of OS updates; perform system configuration changes; apply patches for an enterprise application, e.g., Fusion Middleware components; perform service configuration changes (e.g., tune threads, IO timeouts etc.); perform updates to other non-standard components; reboot service VMs; perform health check; and/or open up a service for public access.

For a soft update, not all of the above steps may be necessary. However, soft updates are still preferably applied when the service access is at a minimum (e.g., during the night). Although some updates may not require a restart or reboot of service runtimes, it is generally recommended that the VMs hosting the service are rebooted, to provide a clean state.

In accordance with an embodiment, an upgrade of a service is similar to a hard update, except that one or more of the components will be undergoing a major change, which may involve one or more of the following: installation of a software component with a different version; minor version upgrade of a software component; or configuration migration.

In accordance with an embodiment, a service may be upgraded if the components being upgraded provide the necessary tooling, and the ability to automate the migration scenario.

In accordance with an embodiment, a repository is assumed to be available as a local (or mounted) file system on the service runtimes. A repository can be used to hold all of the components (patches, configuration files, scripts etc.)

which will be required during the maintenance window. For example, the repository can hold artifacts for different versions of service, e.g., repository:// . . . /<service-name>/<version-#>/<maintenance-window-#>/ . . . .

As shown in FIG. 17, in accordance with an embodiment, prior to a maintenance window, the repository is updated with the necessary components 682, e.g., patches, Puppet manifests, or shell scripts. Updates can be driven using a configuration tool, such as Puppet or a tool or component that provides similar functionality. In accordance with an embodiment, if a service does not have Puppet or the appropriate configuration tool installed, the patching infrastructure will install configuration tool and will apply manifests made available in the repository.

A service administrator may also choose a different automation framework for handling updates. All updates should be transactional, and should be capable of being rolled back in case of failures.

In accordance with an embodiment, the system administrator then defines a maintenance window 685, for use by the service update logic 684. In accordance with an embodiment, the cloud administration console can be used to define the maintenance window. The system administrator then configures information such as: the service name and version of SDP for the services to be patched; whether the maintenance window is a hard or soft window; the length of the maintenance window (typically, 60 mins for hard updates); the time frame for scheduling the updates (typically, a week for hard updates); and any other parameters which qualify the appropriate time for updates.

In accordance with an embodiment, the service update logic will then assign a default time slot for each service. Email notifications can be sent to service administrators in case of 'hard' updates notifying them of a system downtime. In accordance with an embodiment, a service administrator has an option to choose amongst three time slots when his/her service will incur a downtime and update.

At update time, the update is requested by the service update logic 687, and the information in the repository is used to patch or update a service from its original configuration 686, to a modified configuration 689.

Figure 18:
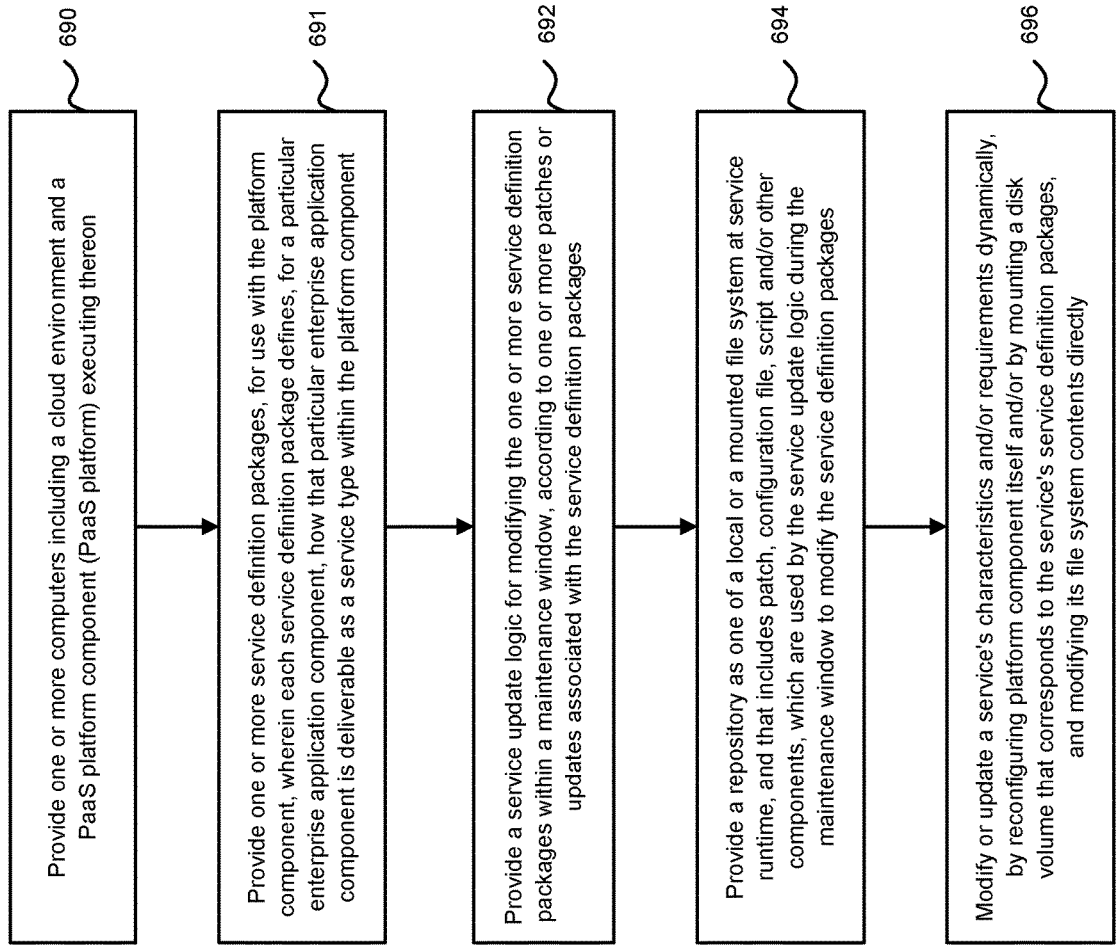
FIG. 18 is a flowchart of a process for patching of service definition packages with a PaaS platform component, in accordance with an embodiment.

FIG. 18 is a flowchart of a process for patching of service definition packages with a PaaS platform component, in accordance with an embodiment. As shown in FIG. 18, at step at step 690, one or more computers are provided, including a cloud environment and a PaaS platform component (PaaS platform) executing thereon.

At step 691, one or more service definition packages are provided, for use with the platform component, wherein each service definition package defines, for a particular enterprise application component, how that particular enterprise application component is deliverable as a service type within the platform component.

At step 692, a service update logic is provided for modifying the one or more service definition packages within a maintenance window, according to one or more patches or updates associated with the service definition packages.

At step 694, a repository is provided as one of a local or a mounted file system at service runtime, and that includes patch, configuration file, script and/or other components, which are used by the service update logic during the maintenance window to modify the service definition packages.

At step 696, a service's characteristics and/or requirements are modified or updated dynamically, by reconfiguring the platform component itself and/or by mounting a disk volume that corresponds to the service's service definition packages, and modifying its file system contents directly.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing a service management engine for use with a cloud computing environment, comprising:
    one or more computers including a cloud environment executing thereon;
    a platform component that is provided within the cloud environment, and that supports self-service provisioning for enterprise applications;
    a plurality of service management engines, in communication with an orchestration engine, which are used to provision services as service types, including one or more provisioning, lifecycle management, and monitoring of the service types, wherein each particular service type is associated with a particular service management engine that handles lifecycle management and monitoring for the particular service type;
    wherein the system determines a plurality of service types to be provisioned for use within the cloud environment, and configures a plurality of corresponding service management engines within the platform component to support the plurality of service types; and
    wherein a service management engine is incorporated into a platform domain by installing an associated service definition package, wherein a service definition package manager handles installation and registration of service management engines associated with the service definition package, and wherein registered service management engines then provision the service types within the platform domain.

2. The system of claim 1, wherein each of the one or more service management engines are used to parse a service definition package, and to provision services as one or more different service types, according to contents of the service definition package.

3. The system of claim 1, wherein the platform component enables service types to be instantiated by the one or more service management engines, as provider service management engines, according to a configuration of the platform component itself.

4. The system of claim 1, wherein the orchestration engine calls service management engines associated with the service types, and performs pre-provisioning associations between the service management engines and one or more provider service management engines.

5. The system of claim 1, wherein for each service type, the orchestration engine calls the service management engine associated with the service type to determine one or more database or provider dependencies for the service management engine.

6. The system of claim 1, further comprising a plurality of provider types that represent resources managed by provider types, wherein when creating a service, the orchestration engine:
matches requirements of a desired service type with capabilities of the provider types;
requests a service type to create an instance of a service;
requests the provider types to create instances of providers; and
associates the service with the providers.

7. A method of providing a service management engine for use with a cloud computing environment, comprising:
providing one or more computers including a cloud environment executing thereon;
providing a platform component within the cloud environment, that supports self-service provisioning for enterprise applications;
providing a plurality of service management engines, in communication with an orchestration engine, which are used to provision services as service types, including one or more provisioning, lifecycle management, and monitoring of the service types, wherein each particular service type is associated with a particular service management engine that handles lifecycle management and monitoring for the particular service type; and
determining a plurality of service types to be provisioned for use within the cloud environment, and configuring corresponding a plurality of service management engines within the platform component to support the plurality of service types;
wherein a service management engine is incorporated into a platform domain by installing an associated service definition package, wherein a service definition package manager handles installation and registration of service management engines associated with the service definition package, and wherein registered service management engines then provision the service types within the platform domain.

8. The method of claim 7, wherein each of the one or more service management engines are used to parse a service definition package, and to provision services as one or more different service types, according to contents of the service definition package.

9. The method of claim 7, wherein the platform component enables service types to be instantiated by the one or more service management engines, as provider service management engines, according to a configuration of the platform component itself.

10. The method of claim 7, wherein the orchestration engine calls service management engines associated with the service types, and performs pre-provisioning associations between the service management engines and one or more provider service management engines.

11. The method of claim 7, wherein for each service type, the orchestration engine calls the service management engine associated with the service type to determine one or more database or provider dependencies for the service management engine.

12. The method of claim 7, further comprising a plurality of provider types that represent resources managed by provider types, wherein when creating a service, the orchestration engine:
matches requirements of a desired service type with capabilities of the provider types;
requests a service type to create an instance of a service;
requests the provider types to create instances of providers; and
associates the service with the providers.

13. A non-transitory computer readable medium, including instructions stored thereon which when read and executed by one or more computers cause the one or more computers to perform the steps comprising:
providing, at one or more computers including a cloud environment executing thereon, a platform component within the cloud environment, that supports self-service provisioning for enterprise applications;
providing a plurality of service management engines, in communication with an orchestration engine, which are used to provision services as service types, including one or more provisioning, lifecycle management, and monitoring of the service types, wherein each particular service type is associated with a particular service management engine that handles lifecycle management and monitoring for the particular service type; and
determining a plurality of service types to be provisioned for use within the cloud environment, and configuring a plurality of corresponding service management engines within the platform component to support the plurality of service types;
wherein a service management engine is incorporated into a platform domain by installing an associated service definition package, wherein a service definition package manager handles installation and registration of service management engines associated with the service definition package, and wherein registered service management engines then provision the service types within the platform domain.

14. The non-transitory computer readable medium of claim 13, wherein each of the one or more service management engines are used to parse a service definition package, and to provision services as one or more different service types, according to contents of the service definition package.

15. The non-transitory computer readable medium of claim 13, wherein the platform component enables service types to be instantiated by the one or more service management engines, as provider service management engines, according to a configuration of the platform component itself.

16. The non-transitory computer readable medium of claim 13, wherein the orchestration engine calls service management engines associated with the service types, and performs pre-provisioning associations between the service management engines and one or more provider service management engines.

17. The non-transitory computer readable medium of claim 13, wherein for each service type, the orchestration engine calls the service management engine associated with the service type to determine one or more database or provider dependencies for the service management engine.

\* \* \* \* \*